United States Patent
Levy et al.

(10) Patent No.: US 10,936,653 B2
(45) Date of Patent: Mar. 2, 2021

(54) AUTOMATICALLY PREDICTING RELEVANT CONTEXTS FOR MEDIA ITEMS

(71) Applicant: Apple Inc., Cupertino, CA (US)

(72) Inventors: Mark H. Levy, Winchester (GB); Arvind S. Shenoy, San Jose, CA (US); Matthias Mauch, London (GB); Daniel Cartoon, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 529 days.

(21) Appl. No.: 15/720,880

(22) Filed: Sep. 29, 2017

(65) Prior Publication Data

US 2018/0349492 A1 Dec. 6, 2018

Related U.S. Application Data

(60) Provisional application No. 62/514,102, filed on Jun. 2, 2017.

(51) Int. Cl.
| | | |
|---|---|---|
| *G06F 7/00* | (2006.01) | |
| *G06F 17/30* | (2006.01) | |
| *G06F 16/683* | (2019.01) | |
| *G06N 3/08* | (2006.01) | |
| *G06F 16/635* | (2019.01) | |
| *G06F 16/638* | (2019.01) | |
| *G06N 3/04* | (2006.01) | |
| *G06N 20/20* | (2019.01) | |
| *G06N 5/00* | (2006.01) | |

(52) U.S. Cl.
CPC ......... *G06F 16/685* (2019.01); *G06F 16/635* (2019.01); *G06F 16/639* (2019.01); *G06N 3/0454* (2013.01); *G06N 3/084* (2013.01); *G06N 5/003* (2013.01); *G06N 20/20* (2019.01)

(58) Field of Classification Search
CPC ......... G06F 17/30746; G06F 17/30761; G06F 17/30772; G06N 3/084
USPC ........................................................ 707/754
See application file for complete search history.

(56) References Cited

U.S. PATENT DOCUMENTS

| | | | |
|---|---|---|---|
| 4,607,385 | A | 8/1986 | Maeda |
| 4,996,642 | A | 2/1991 | Hey |
| 5,355,302 | A | 10/1994 | Martin |

(Continued)

FOREIGN PATENT DOCUMENTS

| | | | |
|---|---|---|---|
| EP | 0643359 | A2 | 3/1995 |
| EP | 1050833 | A2 | 11/2000 |

(Continued)

OTHER PUBLICATIONS

New Music Recommendation System is Based on FOAF Personal Profiling, www.masternewmedia.org/music_recommendation/music_recommendation_system/FOAF, Oct. 1, 2005.

(Continued)

*Primary Examiner* — Binh V Ho
(74) *Attorney, Agent, or Firm* — Blank Rome LLP

(57) ABSTRACT

The present technology pertains to automatically contextlabeling media items with relevant contexts, and further for algorithmically generating high quality playlists built around a context that are personalized to a profile of an account. This is accomplished by combining data from observed playlists, and data representing intrinsic properties of media items to predict contexts for media items.

20 Claims, 17 Drawing Sheets

(56) References Cited

U.S. PATENT DOCUMENTS

| | | |
|---|---|---|
| 5,375,235 A | 12/1994 | Berry |
| 5,464,946 A | 11/1995 | Lewis |
| 5,483,278 A | 1/1996 | Strubbe |
| 5,583,763 A | 12/1996 | Atcheson |
| 5,616,876 A | 4/1997 | Cluts |
| 5,724,521 A | 3/1998 | Dedrick |
| 5,754,939 A | 5/1998 | Herz |
| 5,758,257 A | 5/1998 | Herz |
| 5,765,144 A | 6/1998 | Larche |
| 5,835,087 A | 11/1998 | Herz |
| 5,890,152 A | 3/1999 | Rapaport |
| 5,918,014 A | 6/1999 | Robinson |
| 5,926,624 A | 7/1999 | Katz |
| 5,931,454 A | 8/1999 | Kondo |
| 5,950,176 A | 9/1999 | Keiser |
| 6,000,044 A | 12/1999 | Chrysos |
| 6,041,311 A | 3/2000 | Chislenko |
| 6,047,311 A | 4/2000 | Ueno |
| 6,112,186 A | 8/2000 | Bergh |
| 6,134,532 A | 10/2000 | Lazarus |
| 6,266,649 B1 | 7/2001 | Linden et al. |
| 6,289,353 B1 | 9/2001 | Hazlehurst et al. |
| 6,317,722 B1 | 11/2001 | Jacobi et al. |
| 6,345,288 B1 | 2/2002 | Reed |
| 6,346,951 B1 | 2/2002 | Mastronardi |
| 6,347,313 B1 | 2/2002 | Ma |
| 6,349,339 B1 | 2/2002 | Williams |
| 6,381,575 B1 | 4/2002 | Martin |
| 6,430,539 B1 | 8/2002 | Lazarus |
| 6,434,621 B1 | 8/2002 | Pezzillo |
| 6,438,579 B1 | 8/2002 | Hosken |
| 6,487,539 B1 | 11/2002 | Aggarwal |
| 6,526,411 B1 | 2/2003 | Ward |
| 6,532,469 B1 | 3/2003 | Feldman |
| 6,545,209 B1 | 4/2003 | Flannery |
| 6,577,716 B1 | 6/2003 | Minter |
| 6,587,127 B1 | 7/2003 | Leeke |
| 6,615,208 B1 | 9/2003 | Behrens |
| 6,647,371 B2 | 11/2003 | Shinohara |
| 6,687,696 B2 | 2/2004 | Hofmann |
| 6,690,918 B2 | 2/2004 | Evans |
| 6,704,576 B1 | 3/2004 | Brachman |
| 6,727,914 B1 | 4/2004 | Gutta |
| 6,748,395 B1 | 6/2004 | Picker |
| 6,751,574 B2 | 6/2004 | Shinohara |
| 6,785,688 B2 | 8/2004 | Abajian |
| 6,842,748 B1 | 1/2005 | Warner |
| 6,842,761 B2 | 1/2005 | Diamond |
| 6,850,252 B1 | 2/2005 | Hoffberg |
| 6,865,546 B1 | 3/2005 | Song |
| 6,914,891 B2 | 7/2005 | Ha |
| 6,931,454 B2 | 8/2005 | Deshpande |
| 6,933,433 B1 | 8/2005 | Porteus |
| 6,941,324 B2 | 9/2005 | Plastina |
| 6,947,922 B1 | 9/2005 | Glance |
| 6,950,804 B2 | 9/2005 | Strietzel |
| 6,987,221 B2 | 1/2006 | Platt |
| 6,990,497 B2 | 1/2006 | ORourke |
| 6,993,532 B1 | 1/2006 | Platt |
| 7,013,238 B1 | 3/2006 | Weare |
| 7,020,637 B2 | 3/2006 | Bratton |
| 7,021,836 B2 | 4/2006 | Anderson |
| 7,024,424 B1 | 4/2006 | Platt |
| 7,043,479 B2 | 5/2006 | Ireton |
| 7,051,352 B1 | 5/2006 | Schaffer |
| 7,072,846 B1 | 7/2006 | Robinson |
| 7,082,407 B1 | 7/2006 | Bezos |
| 7,096,234 B2 | 8/2006 | Plastina |
| 7,111,240 B2 | 9/2006 | Crow |
| 7,113,917 B2 | 9/2006 | Jacobi |
| 7,113,999 B2 | 9/2006 | Pestoni |
| 7,117,516 B2 | 10/2006 | Khoo |
| 7,120,619 B2 | 10/2006 | Drucker |
| 7,127,143 B2 | 10/2006 | Elkins, II et al. |
| 7,133,924 B1 | 11/2006 | Rosenberg |
| 7,136,866 B2 | 11/2006 | Springer, Jr. |
| 7,139,723 B2 | 11/2006 | Conkwright |
| 7,159,000 B2 | 1/2007 | Plastina |
| 7,174,126 B2 | 2/2007 | McElhatten |
| 7,180,473 B2 | 2/2007 | Horie |
| 7,194,421 B2 | 3/2007 | Conkwright |
| 7,196,258 B2 | 3/2007 | Platt |
| 7,197,472 B2 | 3/2007 | Conkwright |
| 7,224,282 B2 | 5/2007 | Terauchi |
| 7,228,054 B2 | 6/2007 | Cowgill |
| 7,236,941 B2 | 6/2007 | Conkwright |
| 7,246,041 B2 | 7/2007 | Fukuda |
| 7,256,341 B2 | 8/2007 | Plastina |
| 7,277,870 B2 | 10/2007 | Mourad |
| 7,296,031 B1 | 11/2007 | Platt |
| 7,302,419 B2 | 11/2007 | Conkwright |
| 7,302,468 B2 | 11/2007 | Wijeratne |
| 7,340,455 B2 | 3/2008 | Platt |
| 7,345,232 B2 | 3/2008 | Toivonen |
| 7,358,434 B2 | 4/2008 | Plastina |
| 7,363,314 B2 | 4/2008 | Picker |
| 7,392,212 B2 | 6/2008 | Hancock |
| 7,403,769 B2 | 7/2008 | Kopra |
| 7,415,181 B2 | 8/2008 | Greenwood |
| 7,434,247 B2 | 10/2008 | Dudkiewicz |
| 7,457,852 B2 | 11/2008 | ORourke |
| 7,457,862 B2 | 11/2008 | Hepworth |
| 7,478,323 B2 | 1/2009 | Dowdy |
| 7,487,107 B2 | 2/2009 | Blanchard |
| 7,490,775 B2 | 2/2009 | Biderman |
| 7,493,572 B2 | 2/2009 | Card |
| 7,499,630 B2 | 3/2009 | Koch |
| 7,505,959 B2 | 3/2009 | Kaiser |
| 7,546,254 B2 | 6/2009 | Bednarek |
| 7,568,213 B2 | 7/2009 | Carhart |
| 7,571,121 B2 | 8/2009 | Bezos |
| 7,571,183 B2 | 8/2009 | Renshaw |
| 7,574,422 B2 | 8/2009 | Guan |
| 7,574,513 B2 | 8/2009 | Dunning |
| 7,580,932 B2 | 8/2009 | Plastina |
| 7,585,204 B2 | 9/2009 | Kobayashi |
| 7,599,847 B2 | 10/2009 | Block |
| 7,599,906 B2 | 10/2009 | Kashiwagi |
| 7,599,950 B2 | 10/2009 | Walther |
| 7,644,077 B2 | 1/2010 | Picker |
| 7,647,613 B2 | 1/2010 | Drakoulis |
| 7,650,570 B2 | 1/2010 | Torrens |
| 7,653,761 B2 | 1/2010 | Juster |
| 7,657,224 B2 | 2/2010 | Goldberg |
| 7,657,493 B2 | 2/2010 | Meijer |
| 7,680,849 B2 | 3/2010 | Heller |
| 7,680,959 B2 | 3/2010 | Svendsen |
| 7,685,204 B2 | 3/2010 | Rogers |
| 7,693,887 B2 | 4/2010 | McLaughlin |
| 7,707,603 B2 | 4/2010 | Abanami |
| 7,720,871 B2 | 5/2010 | Rogers |
| 7,725,494 B2 | 5/2010 | Rogers |
| 7,734,569 B2 | 6/2010 | Martin |
| 7,743,009 B2 | 6/2010 | Hangartner |
| 7,797,321 B2 | 9/2010 | Martin |
| 7,797,446 B2 | 9/2010 | Heller |
| 7,801,758 B2 | 9/2010 | Gracie |
| 7,826,444 B2 | 11/2010 | Irvin |
| 7,831,199 B2 | 11/2010 | Ng |
| 7,840,570 B2 | 11/2010 | Martin Cervera |
| 7,853,712 B2 | 12/2010 | Amidon |
| 7,875,788 B2 | 1/2011 | Benyamin |
| 7,889,724 B2 | 2/2011 | Irvin |
| 8,260,656 B1 | 9/2012 | Harbick |
| 8,626,607 B1 * | 1/2014 | Wood ............... G06Q 10/04 705/26.7 |
| 9,269,107 B2 | 2/2016 | Boulter |
| 9,495,447 B1 | 11/2016 | Phillips |
| 9,720,564 B1 | 8/2017 | Vinna |
| 9,870,360 B1 | 1/2018 | Bilinski |
| 10,262,060 B1 * | 4/2019 | Zeiler ............... G06F 16/335 |
| 2001/0007099 A1 | 7/2001 | Rau |
| 2001/0021914 A1 | 9/2001 | Jacobi |
| 2001/0056434 A1 | 12/2001 | Kaplan |

(56) References Cited

U.S. PATENT DOCUMENTS

| | | |
|---|---|---|
| 2002/0002899 A1 | 1/2002 | Gjerdingen |
| 2002/0042912 A1 | 4/2002 | Iijima |
| 2002/0045960 A1 | 4/2002 | Phillips |
| 2002/0059094 A1 | 5/2002 | Hosea |
| 2002/0082901 A1 | 6/2002 | Dunning |
| 2002/0087970 A1 | 7/2002 | Dorricott |
| 2002/0152117 A1 | 10/2002 | Cristofalo |
| 2002/0178223 A1 | 11/2002 | Bushkin |
| 2002/0178276 A1 | 11/2002 | McCartney |
| 2002/0194215 A1 | 12/2002 | Cantrell |
| 2003/0018709 A1 | 1/2003 | Schrempp |
| 2003/0022953 A1 | 1/2003 | Zampini |
| 2003/0033321 A1 | 2/2003 | Schrempp |
| 2003/0055689 A1 | 3/2003 | Block |
| 2003/0097379 A1 | 5/2003 | Ireton |
| 2003/0120630 A1 | 6/2003 | Tunkelang |
| 2003/0135513 A1 | 7/2003 | Quinn |
| 2003/0212710 A1 | 11/2003 | Guy |
| 2003/0221541 A1 | 12/2003 | Platt |
| 2003/0229537 A1 | 12/2003 | Dunning |
| 2004/0002993 A1 | 1/2004 | Toussaint |
| 2004/0003392 A1 | 1/2004 | Trajkovic |
| 2004/0055445 A1 | 3/2004 | Iyoku |
| 2004/0068552 A1 | 4/2004 | Kotz |
| 2004/0070538 A1 | 4/2004 | Horie |
| 2004/0073924 A1 | 4/2004 | Pendakur |
| 2004/0128286 A1 | 7/2004 | Yasushi |
| 2004/0139064 A1 | 7/2004 | Chevallier |
| 2004/0148424 A1 | 7/2004 | Berkson |
| 2004/0158860 A1 | 8/2004 | Crow |
| 2004/0162738 A1 | 8/2004 | Sanders |
| 2004/0194128 A1 | 9/2004 | McIntyre |
| 2004/0215657 A1 | 10/2004 | Drucker |
| 2004/0252604 A1 | 12/2004 | Johnson |
| 2004/0254659 A1 | 12/2004 | Bolas |
| 2004/0263337 A1 | 12/2004 | Terauchi |
| 2004/0267715 A1 | 12/2004 | Poison |
| 2005/0004941 A1 | 1/2005 | Maria Kalker |
| 2005/0019114 A1 | 1/2005 | Sung |
| 2005/0021470 A1 | 1/2005 | Martin |
| 2005/0038819 A1 | 2/2005 | Hicken |
| 2005/0050079 A1 | 3/2005 | Plastina |
| 2005/0060350 A1 | 3/2005 | Baum |
| 2005/0075908 A1 | 4/2005 | Stevens |
| 2005/0091146 A1 | 4/2005 | Levinson |
| 2005/0091147 A1 | 4/2005 | Ingargiola |
| 2005/0098023 A1 | 5/2005 | Toivonen |
| 2005/0102610 A1 | 5/2005 | Jie |
| 2005/0114357 A1 | 5/2005 | Chengalvarayan |
| 2005/0131752 A1 | 6/2005 | Grade |
| 2005/0141709 A1 | 6/2005 | Bratton |
| 2005/0154608 A1 | 7/2005 | Paulson |
| 2005/0160458 A1 | 7/2005 | Baumgartner |
| 2005/0193014 A1 | 9/2005 | Prince |
| 2005/0193054 A1 | 9/2005 | Wilson |
| 2005/0195696 A1 | 9/2005 | Rekimoto |
| 2005/0198075 A1 | 9/2005 | Plastina |
| 2005/0203807 A1 | 9/2005 | Bezos |
| 2005/0210009 A1 | 9/2005 | Tran |
| 2005/0210101 A1 | 9/2005 | Janik |
| 2005/0210507 A1 | 9/2005 | Hawkins |
| 2005/0216855 A1 | 9/2005 | Kopra |
| 2005/0216859 A1 | 9/2005 | Paek |
| 2005/0222989 A1 | 10/2005 | Haveliwala |
| 2005/0223039 A1 | 10/2005 | Kim |
| 2005/0234891 A1 | 10/2005 | Walther |
| 2005/0235811 A1 | 10/2005 | Dukane |
| 2005/0240494 A1 | 10/2005 | Cue |
| 2005/0251440 A1 | 11/2005 | Bednarek |
| 2005/0256867 A1 | 11/2005 | Walther |
| 2005/0276570 A1 | 12/2005 | Reed |
| 2005/0278377 A1 | 12/2005 | Mirrashidi |
| 2006/0015571 A1 | 1/2006 | Fukuda |
| 2006/0015904 A1 | 1/2006 | Marcus |
| 2006/0018208 A1 | 1/2006 | Nathan |
| 2006/0018209 A1 | 1/2006 | Drakoulis |
| 2006/0020062 A1 | 1/2006 | Bloom |
| 2006/0020662 A1 | 1/2006 | Robinson |
| 2006/0026263 A1 | 2/2006 | Raghavan |
| 2006/0032363 A1 | 2/2006 | Platt |
| 2006/0053077 A1 | 3/2006 | Mourad |
| 2006/0059225 A1 | 3/2006 | Stonehocker |
| 2006/0062094 A1 | 3/2006 | Nathan |
| 2006/0067296 A1 | 3/2006 | Bershad |
| 2006/0074750 A1 | 4/2006 | Clark |
| 2006/0080251 A1 | 4/2006 | Fried |
| 2006/0080356 A1 | 4/2006 | Burges |
| 2006/0091203 A1 | 5/2006 | Bakker |
| 2006/0095516 A1 | 5/2006 | Wijeratne |
| 2006/0100978 A1 | 5/2006 | Heller |
| 2006/0107823 A1 | 5/2006 | Platt |
| 2006/0112098 A1 | 5/2006 | Renshaw |
| 2006/0123052 A1 | 6/2006 | Robbin |
| 2006/0136344 A1 | 6/2006 | Jones |
| 2006/0143236 A1* | 6/2006 | Wu .............. G11B 27/034 |
| 2006/0153040 A1 | 7/2006 | Girish |
| 2006/0155754 A1 | 7/2006 | Lubin |
| 2006/0156239 A1 | 7/2006 | Jobs |
| 2006/0165571 A1 | 7/2006 | Seon |
| 2006/0168340 A1 | 7/2006 | Heller |
| 2006/0168616 A1 | 7/2006 | Candelore |
| 2006/0171682 A1 | 8/2006 | Komano |
| 2006/0173910 A1 | 8/2006 | McLaughlin |
| 2006/0173916 A1 | 8/2006 | Sibley |
| 2006/0174008 A1 | 8/2006 | Abanami |
| 2006/0195462 A1 | 8/2006 | Rogers |
| 2006/0195512 A1 | 8/2006 | Rogers |
| 2006/0195513 A1 | 8/2006 | Rogers |
| 2006/0195514 A1 | 8/2006 | Rogers |
| 2006/0195515 A1 | 8/2006 | Beaupre |
| 2006/0195516 A1 | 8/2006 | Beaupre |
| 2006/0195521 A1 | 8/2006 | New |
| 2006/0195789 A1 | 8/2006 | Rogers |
| 2006/0195790 A1 | 8/2006 | Beaupre |
| 2006/0204220 A1 | 9/2006 | Lee |
| 2006/0206478 A1 | 9/2006 | Glaser |
| 2006/0253874 A1 | 11/2006 | Stark |
| 2006/0265421 A1 | 11/2006 | Ranasinghe |
| 2006/0277098 A1 | 12/2006 | Chung |
| 2006/0282304 A1 | 12/2006 | Bedard |
| 2006/0282311 A1 | 12/2006 | Jiang |
| 2006/0288367 A1 | 12/2006 | Swix |
| 2007/0014536 A1 | 1/2007 | Hellman |
| 2007/0016507 A1 | 1/2007 | Tzara |
| 2007/0043829 A1 | 2/2007 | Dua |
| 2007/0073596 A1 | 3/2007 | Alexander |
| 2007/0100690 A1 | 5/2007 | Hopkins |
| 2007/0101373 A1 | 5/2007 | Bodlanender |
| 2007/0118546 A1 | 5/2007 | Acharya |
| 2007/0136264 A1 | 6/2007 | Tran |
| 2007/0156677 A1 | 7/2007 | Szabo |
| 2007/0156732 A1 | 7/2007 | Surendran |
| 2007/0161402 A1 | 7/2007 | Ng |
| 2007/0162502 A1* | 7/2007 | Thomas .............. G06F 16/7867 |
| 2007/0162546 A1 | 7/2007 | McLaughlin |
| 2007/0165577 A1 | 7/2007 | Baker |
| 2007/0174866 A1 | 7/2007 | Brown |
| 2007/0183742 A1 | 8/2007 | Cowgill |
| 2007/0203790 A1 | 8/2007 | Torrens |
| 2007/0219996 A1 | 9/2007 | Jarvinen |
| 2007/0220566 A1 | 9/2007 | Ahmad-Taylor |
| 2007/0244880 A1 | 10/2007 | Martin |
| 2007/0250429 A1 | 10/2007 | Walser |
| 2007/0250761 A1 | 10/2007 | Bradley |
| 2007/0265979 A1 | 11/2007 | Hangartner |
| 2007/0271286 A1 | 11/2007 | Purang |
| 2007/0271287 A1 | 11/2007 | Acharya |
| 2007/0294096 A1 | 12/2007 | Randall |
| 2008/0004948 A1 | 1/2008 | Flake |
| 2008/0004990 A1 | 1/2008 | Flake |
| 2008/0010266 A1 | 1/2008 | Brunn |
| 2008/0021851 A1 | 1/2008 | Alcalde |
| 2008/0027881 A1 | 1/2008 | Bisse |
| 2008/0033979 A1 | 2/2008 | Vignoli |

(56) References Cited

U.S. PATENT DOCUMENTS

| | | |
|---|---|---|
| 2008/0040326 A1 | 2/2008 | Chang |
| 2008/0046317 A1 | 2/2008 | Christianson |
| 2008/0065659 A1 | 3/2008 | Watanabe |
| 2008/0077264 A1 | 3/2008 | Irvin |
| 2008/0082467 A1 | 4/2008 | Meijer |
| 2008/0091717 A1 | 4/2008 | Garbow |
| 2008/0109378 A1 | 5/2008 | Papadimitriou |
| 2008/0115173 A1 | 5/2008 | Ellis |
| 2008/0120339 A1 | 5/2008 | Guan |
| 2008/0126384 A1 | 5/2008 | Toms |
| 2008/0133593 A1 | 6/2008 | Clark |
| 2008/0133601 A1 | 6/2008 | Cervera |
| 2008/0133737 A1 | 6/2008 | Fischer |
| 2008/0147711 A1* | 6/2008 | Spiegelman .......... G06F 16/437 |
| 2008/0154942 A1 | 6/2008 | Tsai |
| 2008/0155057 A1 | 6/2008 | Khedouri |
| 2008/0155588 A1 | 6/2008 | Roberts |
| 2008/0168059 A1 | 7/2008 | Hoashi |
| 2008/0195438 A1 | 8/2008 | Manfredi |
| 2008/0215173 A1 | 9/2008 | Hicken |
| 2008/0220855 A1 | 9/2008 | Chen |
| 2008/0250067 A1* | 10/2008 | Svendsen ............. G06F 16/435 |
| 2008/0256106 A1 | 10/2008 | Whitman |
| 2008/0270221 A1 | 10/2008 | Clemens |
| 2009/0006353 A1 | 1/2009 | Vignoli |
| 2009/0024504 A1 | 1/2009 | Lerman |
| 2009/0024510 A1 | 1/2009 | Chen |
| 2009/0043811 A1 | 2/2009 | Yamamoto |
| 2009/0048957 A1 | 2/2009 | Celano |
| 2009/0055426 A1* | 2/2009 | Kalasapur ............. G06F 16/637 |
| 2009/0063414 A1 | 3/2009 | White |
| 2009/0070267 A9 | 3/2009 | Hangartner |
| 2009/0073174 A1 | 3/2009 | Berg |
| 2009/0076939 A1 | 3/2009 | Berg |
| 2009/0076974 A1 | 3/2009 | Berg |
| 2009/0083307 A1 | 3/2009 | Cervera |
| 2009/0089222 A1 | 4/2009 | Castro |
| 2009/0106085 A1 | 4/2009 | Raimbeault |
| 2009/0164641 A1 | 6/2009 | Rogers |
| 2009/0210415 A1 | 8/2009 | Martin |
| 2009/0276368 A1 | 11/2009 | Martin |
| 2010/0011388 A1* | 1/2010 | Bull ................. H04N 21/42201 725/9 |
| 2010/0161595 A1 | 6/2010 | Martin |
| 2010/0169328 A1 | 7/2010 | Hangartner |
| 2010/0188405 A1* | 7/2010 | Haughay, Jr. .......... G06Q 30/02 345/440 |
| 2011/0016120 A1* | 1/2011 | Haughay, Jr. .......... G06F 3/0482 707/734 |
| 2011/0060738 A1 | 3/2011 | Gates |
| 2011/0119127 A1 | 5/2011 | Hangartner |
| 2011/0246508 A1* | 10/2011 | Maekawa ................ G06F 16/68 707/769 |
| 2011/0295843 A1* | 12/2011 | Ingrassia, Jr. ....... G06F 16/4387 707/723 |
| 2012/0030230 A1* | 2/2012 | Sheinkop ............. G11B 27/105 707/769 |
| 2012/0041967 A1* | 2/2012 | Askey ................... G06F 16/686 707/769 |
| 2012/0054666 A1 | 3/2012 | Baird-Smith |
| 2012/0290648 A1* | 11/2012 | Sharkey .................. G06F 16/40 709/204 |
| 2014/0122477 A1* | 5/2014 | McFarlane ............. H04H 60/07 707/736 |
| 2014/0223099 A1 | 8/2014 | Kidron |
| 2014/0237361 A1 | 8/2014 | Martin |
| 2014/0280181 A1 | 9/2014 | Rodger |
| 2015/0033292 A1 | 1/2015 | Nguyen |
| 2015/0039620 A1 | 2/2015 | Ning |
| 2015/0039644 A1 | 2/2015 | Trivedi |
| 2015/0106320 A1 | 4/2015 | Boulter |
| 2015/0153910 A1 | 6/2015 | Wheeler |
| 2015/0193192 A1 | 7/2015 | Kidron |
| 2015/0268800 A1 | 9/2015 | O'Konski |
| 2015/0309768 A1* | 10/2015 | van der Heide .... G06F 16/9535 700/94 |
| 2015/0331940 A1 | 11/2015 | Manning |
| 2016/0066038 A1 | 3/2016 | Chesluk |
| 2016/0162125 A1* | 6/2016 | Martella ................ G06F 3/0482 715/716 |
| 2016/0335266 A1* | 11/2016 | Ogle ....................... G06Q 10/10 |
| 2016/0360271 A1* | 12/2016 | Magahern ............. G06F 9/4843 |
| 2017/0092247 A1* | 3/2017 | Silverstein ............. G10H 1/368 |
| 2018/0015369 A1 | 1/2018 | Schupak |
| 2018/0189306 A1* | 7/2018 | Lamere ............... G06F 16/4387 |
| 2018/0256078 A1* | 9/2018 | Vaterlaus .............. A61B 5/1112 |
| 2018/0349011 A1 | 12/2018 | Morag |
| 2019/0325035 A1 | 10/2019 | Sagui |

FOREIGN PATENT DOCUMENTS

| | | |
|---|---|---|
| EP | 1231788 A1 | 8/2002 |
| EP | 1420388 A1 | 5/2004 |
| EP | 1548741 A1 | 6/2005 |
| EP | 1906320 A1 | 4/2008 |
| EP | 2161668 A1 | 3/2010 |
| EP | 2306344 A1 | 4/2011 |
| JP | H1152965 A | 2/1999 |
| JP | 2002108351 A | 4/2002 |
| JP | 2002320203 A | 10/2002 |
| JP | 2003255958 A | 9/2003 |
| JP | 2004221999 A | 8/2004 |
| JP | 2005027337 A | 1/2005 |
| JP | 2008165759 A | 7/2008 |
| JP | 2009048706 A | 3/2009 |
| KR | 20020025579 A | 4/2002 |
| WO | 0017793 A1 | 3/2000 |
| WO | 2003019560 A1 | 3/2003 |
| WO | 2003019560 A3 | 3/2003 |
| WO | 2003036541 A1 | 5/2003 |
| WO | 2003051051 A1 | 6/2003 |
| WO | 2004070538 A2 | 8/2004 |
| WO | 2005013114 A1 | 2/2005 |
| WO | 2005038666 A1 | 4/2005 |
| WO | 2005046252 A3 | 5/2005 |
| WO | 2005071569 A1 | 8/2005 |
| WO | 2005106877 A1 | 11/2005 |
| WO | 2005115107 A2 | 12/2005 |
| WO | 2006040710 A1 | 4/2006 |
| WO | 2006052837 A2 | 5/2006 |
| WO | 2006075032 A1 | 7/2006 |
| WO | 2006096664 A2 | 9/2006 |
| WO | 2006097795 A3 | 9/2006 |
| WO | 2006114451 A1 | 11/2006 |
| WO | 2007038806 A2 | 4/2007 |
| WO | 2007075622 A2 | 7/2007 |
| WO | 2007092053 A1 | 8/2007 |
| WO | 2007134193 A2 | 11/2007 |
| WO | 2009149046 A1 | 12/2009 |

OTHER PUBLICATIONS

Social Networking Meets Music Listening: Mecora Launches Radio 2.0: www.masternewmedia.org/news/2006/04/13/sociaL networking_meets_music_listening.htm, Apr. 13, 2006.
"Touch Tunes Signs License Agreement for BMI Music in Digital Jukeboxes," www.bmi.com/news/200403/20040324b.asp, Web Page, BMI .TM. Figures Don'T Lie, Mar. 24, 2004.
A. Das, M. Datar, A. Garg, and S. Rajaram. 'Google News Personalization: Scalable Online Collaborative Filtering'. In WWW'07: Proceedings of the 16th international conference on World Wide Web, pp. 271-280, New York, NY, USA, 2007. ACM Press.
Adcock et al., "AreWeThereYet?—A Temporally Aware Media Player," In Proc. 9th Australasian User Interface Conference (AUIC 2008), Wollongong, Aust. 2008, pp. 29-32.
Alvear, Jose, "Risk-Free Trial Streaming Media Delivery Tools," Streaming Media.com; www.streamingmedia.com/article.ap?id=5768, Jun. 30, 2000.
Andreja Andric and Goffredo Haus, "Estimating Quality of Playlists by Sight," AXMEDIS'05, IEEE Computer Society Washington, DC, 2005.

(56) References Cited

OTHER PUBLICATIONS

Apple: iTunes 4.2 User Guide for Windows; Dec. 2003; retrieved from the internet: URL: http://www2.austin.cc.tx.us/tcm/projects/itunes.pdf; pp. 10, 17-19. (Added Ref Nov. 5, 2009).
Arto Lehtiniemi and Jamo Seppanen, "Evaluation of Automatic Mobile Playlist Generator," IS-CHI 2007: Mobile devices and services, 2007, pp. 452-459.
Asa Rudstrom, "Co-Construction of Hybrid Spaces," A Dissertation submitted to the University of Stockholm in partial fulfillment of the requirements for the Degree of Doctor of Philosophy, Department of Computer and Systems Sciences Stockholm University and Royal Institute of Technology, pp. 1-69, Nov. 2005.
Bender, 'Twenty Years of Personalization: All about the Daily Me,' Educause Review (Sep./Oct. 2002).
Bender, et al., 'Newspace: Mass Media and Personal Computing,' Proceedings of USENIX, Conference, pp. 329-348 (Summer 1991).
Cano, Pedro et al., "On the Use of FastMap for Audio Retrieval and Browsing," The International Conference on Music Information Retrieval and Related Activities (ISMIR 2002), Paris, France, Oct. 2002, 2 pages.
Carlson et al. "Internet Banking: Market Developments and Regulatory Issues," In the New Economy: What Changed, and the Challenges for Economic Policy, May 2001, http://www.occ.gov/netbank/SGEC2000.pdf.
Connell, Lain et al., "Ontological Sketch Models: Highlighting User-System Misfits," in P. Palanque, E. O'Neill and P. Johnson, editors, Proceedings of Human Computer Interaction (HCI) Bath, England, Sep. 2003, London Springer, pp. 1-16.
Crampes et al., "Automatic Playlist Composition in a Dynamic Music Landscape," SADPI'07, May 21-22, 2007, Montpellier, France, vol. 259, 2007, pp. 15-20.
Deshpande, Mukund, et al., 'Item-Based Top-N Recommendation Algorithms,' ACM Transactions on Information Systems, 22:1 (Jan. 2004), pp. 143-177.
Elias Pampalk, Arthur Flexer and Gerhard Widmer, "Improvements of Audio-Based Music Similarity and Genre Classification," in Proceedings of 6th International Conference on Music Information Retrieval (ISMIR'05), pp. 628-633, London, UK, Sep. 2005.
Hijikata et al., "Content-based Music Filtering System with Editable User Profile," Proc. of the 2006 ACM Symposium on Applied Computing, Dijon, France, pp. 1050-1057.
I. Scihira., "A Characterization of Singular Graphs," Electronic Journal of Linear Algebra, 16:451-462, 2007.
Industry Standard, The, Help FAQs for Standard Prediction Market, http://www.thestandard.com/help, downloaded Jun. 29, 2009.
IP City, Integrated Project on Interaction and Presence on Urban Environments-Demonstrators on Large-Scale Events Applications; ipcity.eu; Giulio Jacucci, John Evans, Tommi Ilmonen; pp. 1-37; Feb. 9, 2007.
J. Dean and S. Ghemawat, 'MapReduce: Simplied Data Processing on Large Clusters'. Commun. ACM, 51 (1):107-113, 2008.
J.M. Buldu, P. Cano, M. Koppenberger, J. A. Almendral and S> Boccaletti, "The complex network of musical tastes," New Journal of Physics, vol. 9, No. 6, Jun. 2007, p. 172, IOP Publishing Ltd., Bristol, United Kingdom and Deutsche Physikalische Gesellschaft.
Jimeng Sun, Dacheng Tao, Spiros Papadimitriou, Philip Yu, Christos Faloutsos, "Incremental tensor analysis: theory and applications," ACM, Oct. 2008, pp. 1-37.
John Thompson, 'A Graphic Representation of Interaction With the Nexis News Database,' MIT Thesis (May 1983).
Jonathan L. Orwant, 'Doppelganger Goes to School: Machine Learning for User Modeling,' MIT Master of Science Thesis (Sep. 1993).
Jonathan L. Orwant, 'Doppelganger: A User Modeling System,' MIT Bachelor's Thesis (Jun. 1991).
Leong et al., "Randomness as a Resource for Design," Proceedings of teh 6th conference on Designing Interactive systems, 2006, University Park, PA, pp. 132-139.
Loeb et al., "Lessons from LyricTimeTM: A Prototype Multimedia System" 4th IEEE ComSoc International Workshop on Multimedia Communications (Apr. 1992).
Loeb, Shoshana, "Architecting Personalized Delivery of Multimedia Information," Communications of the ACM (Dec. 1992).
Loeb, Shoshana, "Delivering Interactive Multimedia Documents over Networks," IEEE Communications Magazine, May 1992, 8 pages.
Logan, Beth et al., "A Music Similarity Function Based on Signal Analysis," IEEE International Conference on Multimedia and Expo (ICME), Tokyo, Japan, Aug. 2001, IEEE Press, pp. 952-955.
Logan, Beth, "Content-Based Playlist Generation: Exploratory Experiments," The International Conference on Music Information Retrieval and Related Activities (ISMIR 2002), Paris, France, Oct. 2002,2 pages.
M. O'Connor, D. Cosley, J.A. Konstan, J. Riedl, "PolyLens: A Recommender System for Groups of Users," European Conference on Computer Supported Co-Operative Work at Bonn, Germany, Published 2001, pp. 199-218.
Maidin, Donncha O et al., "The Best of Two Worlds: Retrieving and Browsing," Proceedings of the COST G-6 Conference on Digital Audio Effects (DAFX-00), Verona, Italy, Dec. 7-9, 2000, 4 pages.
McCarthy, et al., "Augmenting the Social Space of an Academic Conference," Information School, University of Nashington and Department of Computer Science and Engineering, University of Minnesota; pp. 1-10; Nov. 6-10, 2004.
N. A. Lazar, "Bayesian Empirical Likelihood," Technical Report, Carnegie Mellon University, Department of Statistics, 2000; 26 pages.
Notess, Mark et al., "Variations2: Toward Visual Interface for Digital Music Libraries," Second International Workshop on Visual Interfaces to Digital Libraries, 2002, 6 pages.
P. Indyk and J. Matousek. 'Low-Distortion Embeddings of Finite Metric Spaces'. In Handbook of Discrete and Computational Geometry, pp. 177-196. CRC Press, 2004.
Sachet, Francois, "A Taxonomy of Musical Genres," Content-Based Multimedia Information Access Conference (RIAO), Paris, Apr. 2000, 8 pages.
Paek, et al., "Toward University Mobile Interaction for Shared Displays," Microsoft Research, Redmond, WA, pp. 1-4, Nov. 6-10, 2004.
Pampalk, et al., "Content-based Organization and Visualization of Music Archives," ACM Multimedia, Juan les Pins, France, Dec. 2002, pp. 570-579.
Pauws, et al., "PATS: Realization and User Evaluation of an Automatic Playlist Generator," The International Conferences on Music Information Retrieval and Related Activities (ISMIR 2002), Paris, France, Oct. 2002,9 pages.
Porter, Dave, "Digital Music Sales Triple to $1.1 Billion in 2005" www.axcessnews.com/modules/wfsection/article.php?articleid=8327, Web Page, Feb. 24, 2006, Maintenance Fees.
Ragno et al., "Inferring Similarity Between Music Objects with Application to Playlist Generation," MIR'05, Nov. 10-11, 2005, Singapore, pp. 73-80.
Rauber, et al., "The SOM-enhanced JukeBox: Organization and Visualization of Music Collections Based on Perceptual Models," Journal of New Music Research, vol. 32, Nov. 2, 2003, pp. 193-210.
S. Baluja, R. Seth, D. Sivakumar, Y. Jing, J. Yagnik, S. Kumar, D. Ravichandran, and M. Aly, "Video Suggestion and Discovery for YouTube: Taking Random Walks Through the View Graph," in WWW '08: Proceedings of the 17th international conference on World Wide Web, pp. 895-904, Beijing, China, 2008. ACM Press.
Scheible, et al., "MobiLenin—Combining a Multi-Track Music Video, Personal Mobile Phones and a Public Display into Multi-User Interactive Entertainment," Media Lab, University of Art and Design, Helsinki, Finland, pp. 1-10, Nov. 6-10, 2005.
Shneiderman, Ben, "Tree Visualization with Tree-Maps: 2-d Space-Filling Approach," ACM Transactions on Graphics, vol. 11, No. 1, Jan. 1992, pp. 92-99.
Shneiderman, Ben, "Treemaps for Space-Contrained Visualization of Hierarchies," http://www.scumd.edutheil/treemaphistory!, last updated Apr. 28, 2006, 16 pages.

(56) References Cited

OTHER PUBLICATIONS

Smart Computing, 'The Scoop on File-Sharing Services,' Dec. 2000, vol. 11, Issue 12; pp. 30-33 in printed issue. Available at www.smartcomputing.com/editorial/article.asp?article=articles%2F2000%Fs11-12.degree./02F08s12.asp.

Steffen Pauws and Berry Eggen, "Realization and User Evaluation of an Automatic Playlist Generator," Journal New Music Research, 2003, vol. 32, No. 2, pp. 179-192.

Strands Business Solutions. 'Integration Document v2.0,' Published May 2008, [online retrieved on Jan. 21, 2010] Retrieved from the internet <URL: http://recommender.strands.comfdocfSBS-Integration-Document.pdf>, entire document—18 pages.

T. Hofmann. 'Latent Semantic Models for Collaborative Filtering'. ACM Transactions on Information Systems, 22:89-115, 2004.

T. Hofmann. 'Unsupervised Learning by Probabilistic Latent Semantic Analysis'. Mach. Learn., 42:177-196, 2001.

Teng et al., "Design and Evaluation of mProducer: a Mobile Authoring Tool for Personal Experience computing," [online], MUM 2004, College Park, Maryland, USA, Oct. 27-29, 2004 [retrieved on Dec. 17, 2010]. [http://citeseerx.ist.psu.edu/viewdoc/download?doi=10.1.1.131.2933&rep=re-p1&type=pdf].

Tom Bunzel, 'Easy Digital Music,' QUE Publisher, Aug. 18, 2004, Chapters 5 and 8.

Treemap, University of Maryland, http://www.cs.umd.edu/hcil/treemap/, last udpated Aug. 5, 2003, 4 pages.

Trustees of Indiana University, Variations2, The Indiana University Digital Music Library, http://dmi.indiana.edu/, last updated May 11, 2005.

Tzanetakis, et al., "MARSYAS3D: A Prototype Audio Browser-Editor Using a Large Scale Immersive Visual and Audio Display," Proceedings of the 2001 International Conference on Auditory Display, Espoo, Finland, Jul./Aug. 2001, 5 pages.

Wolfers, Justin and Zitzewitz, Eric, "Prediction Markets," Journal of Economic Perspectives, Spring 2004, pp. 107-126, vol. 18, No. 2.

Y. Dempster, N. Laird, and D. Rubin. 'Maximum Likelihood from Incomplete Data via the EM Algorithm'. Jour. of the Royal Stat. Soc., Ser. B., 39:1047-1053, 1977.

Yates et al., "ShopSmart: Product Recommendations through Technical Specifications and User Reviews," Temple University, CIKM, Oct. 26-30, 2008, Napa Valley, CA, USA, 2 pages.

Yen, Yi-Wyn, "Apple announces a 32GB iPhone 3G by Jun. 15, 2009?," The Industry Standard, Apr. 2, 2009, http://www.thestandard.com/preditions/channel/hardware, downloaded Apr. 8, 2009.

* cited by examiner

| Media item representation | Context |
|---|---|
| 47836486 | workout |
| 47836486 | gym |
| 48762856 | chill |
| 48762856 | relax |
| 45762678 | chill |
| 45762678 | workout |
| ... | |

<workout 0.98, chill 0.12, gym 0.85, running 0.91, shower 0.75, run 0.92, car 0.56, party 0.72, sleep 0.05, work 0.43, relax 0.07, summer 0.65, ...>

Figure 9

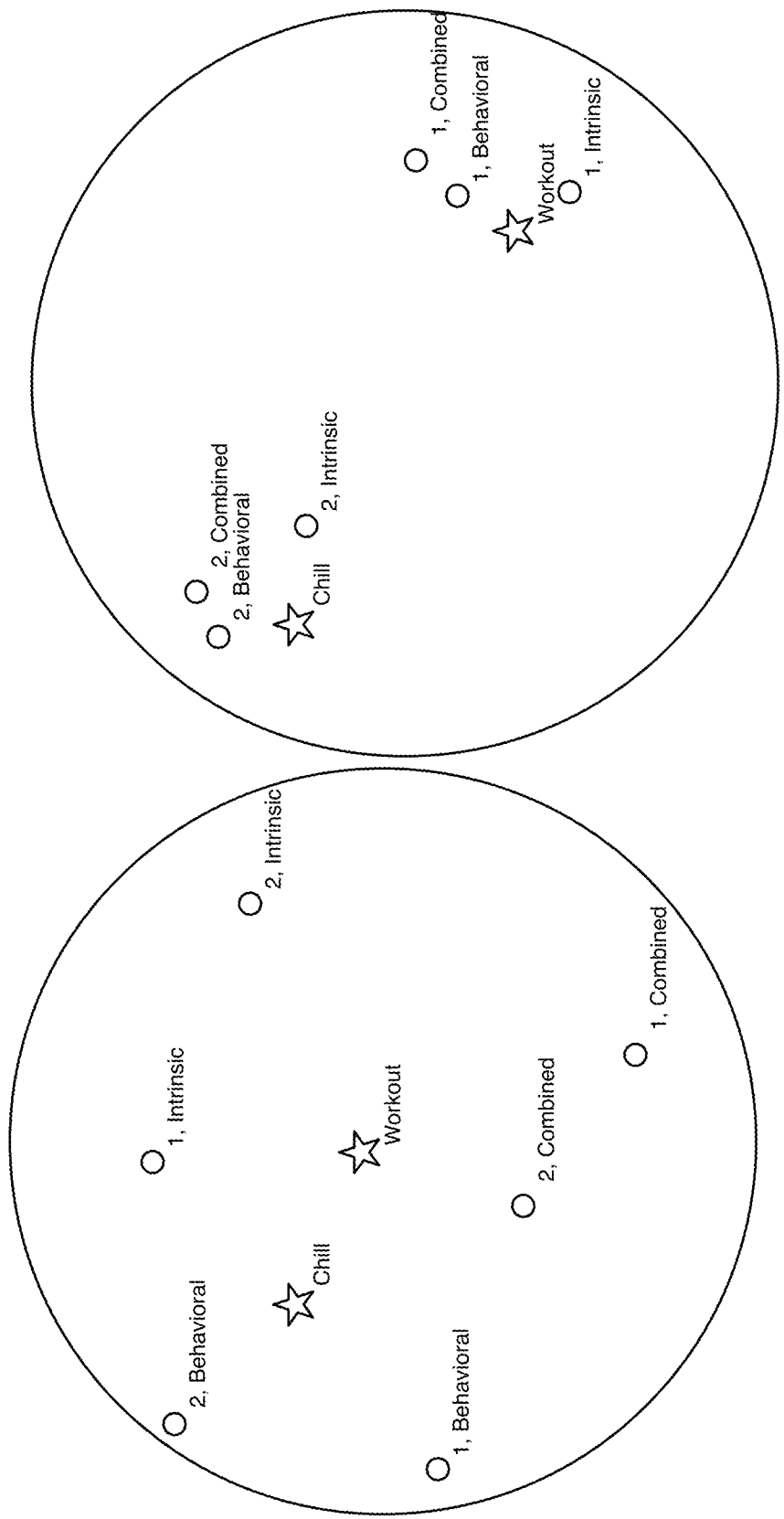

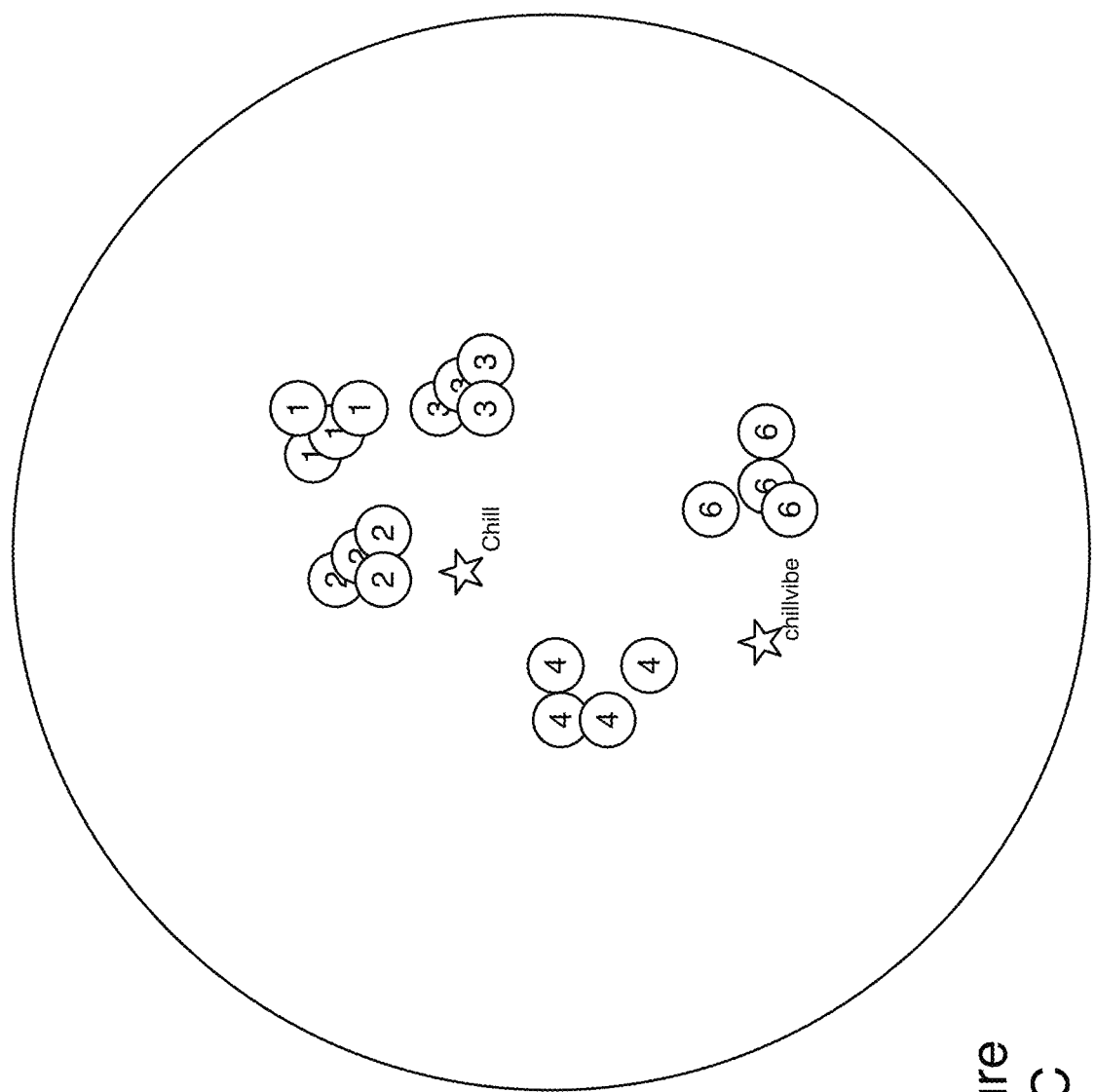

AUTOMATICALLY PREDICTING RELEVANT CONTEXTS FOR MEDIA ITEMS

RELATED APPLICATIONS

This application claims priority to and the benefit of U.S. Provisional Application No. 62/514,102, filed on Jun. 2, 2017, which is incorporated herein by reference in its entirety.

TECHNICAL FIELD

The present technology pertains to associating media items with relevant contexts and more specifically pertains to predicting relevant contexts for media items.

BACKGROUND

Playlists are highly context dependent. While in a generic sense, a playlist can be considered any list of media items arranged in a play back order, a context is integral to the definition of many playlists. Media items are selected for inclusion based on this context. For example, playlists contain media items collected because the media items go together well in a context such as running, workout, dance, party, wedding, chill out, media items for me, etc. Each context defines a criterion for a media item's inclusion in the playlist.

Many automatic playlist creation services are known, but all are limited by a playlisting algorithm's input data regarding context. Known automatically playlist creation services can make playlists around contexts that can be derived from media item metadata (genre, artist, release date), playback data (popularity), media item preference or similarity data (matching media items with user profiles), but these contexts are limited. In some instances, some media services have had editors tag media items with a limited vocabulary of contexts such as those that represent common moods, or workout, for example, to allow playlists to be generated automatically for these contexts, but having editors tag media items results in only popular media items getting labeled, is left to the subjective taste of a few people, and doesn't cover enough contexts. In short the limited amount of contexts available in the above approaches, or the poor quality of the context data severely limits the possibilities to automatically create quality playlists.

There is a strong need to be able to automatically develop playlists for a large vocabulary of possible contexts because the prevalence media item subscription services and a shift in media item consumption from album-centric consumption to single media item centric consumption have caused a shift in consumption profiles of users. While it used to be enough to create playlists predominantly based around favorite artists or albums, today's users tend to have a much more diverse consumption interest due to the fact that today's users have access to a much larger universe of media items though subscription services. While yesterday's users might find their consumption interests strongly correlated to specific genres, such correlation is very much diminished for today's users. While user's consumption profiles have changed, users continue to approach playlists from contexts, and as such serving media items according to context is imperative.

Determining contexts for media items is a complex technical problem. Beyond the context data derived from media item metadata, quality context data for media items does not exist. It is not sufficient to merely observe what contexts media items have been associated with in the past because many users will associate different media items with different contexts, and because only a very limited number of media items have been associated with contexts, so this data is unavailable for the majority of media items.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only example embodiments of the disclosure and are not therefore to be considered to be limiting of its scope, the principles herein are described and explained with additional specificity and detail through the use of the accompanying drawings in which:

FIG. 4 illustrates an example association of media items with contexts in accordance with aspects of the present technology;

FIG. 9 illustrates an example of a media item with context associations in accordance with aspects of the present technology;

FIG. 10A illustrates an example illustration of a portion of a context embedding space in accordance with aspects of the present technology;

FIG. 10B illustrates an example illustration of a portion of a context embedding space in accordance with aspects of the present technology;

FIG. 10C illustrates an example illustration of a portion of a context embedding space in accordance with aspects of the present technology;

DESCRIPTION

Figure 1:
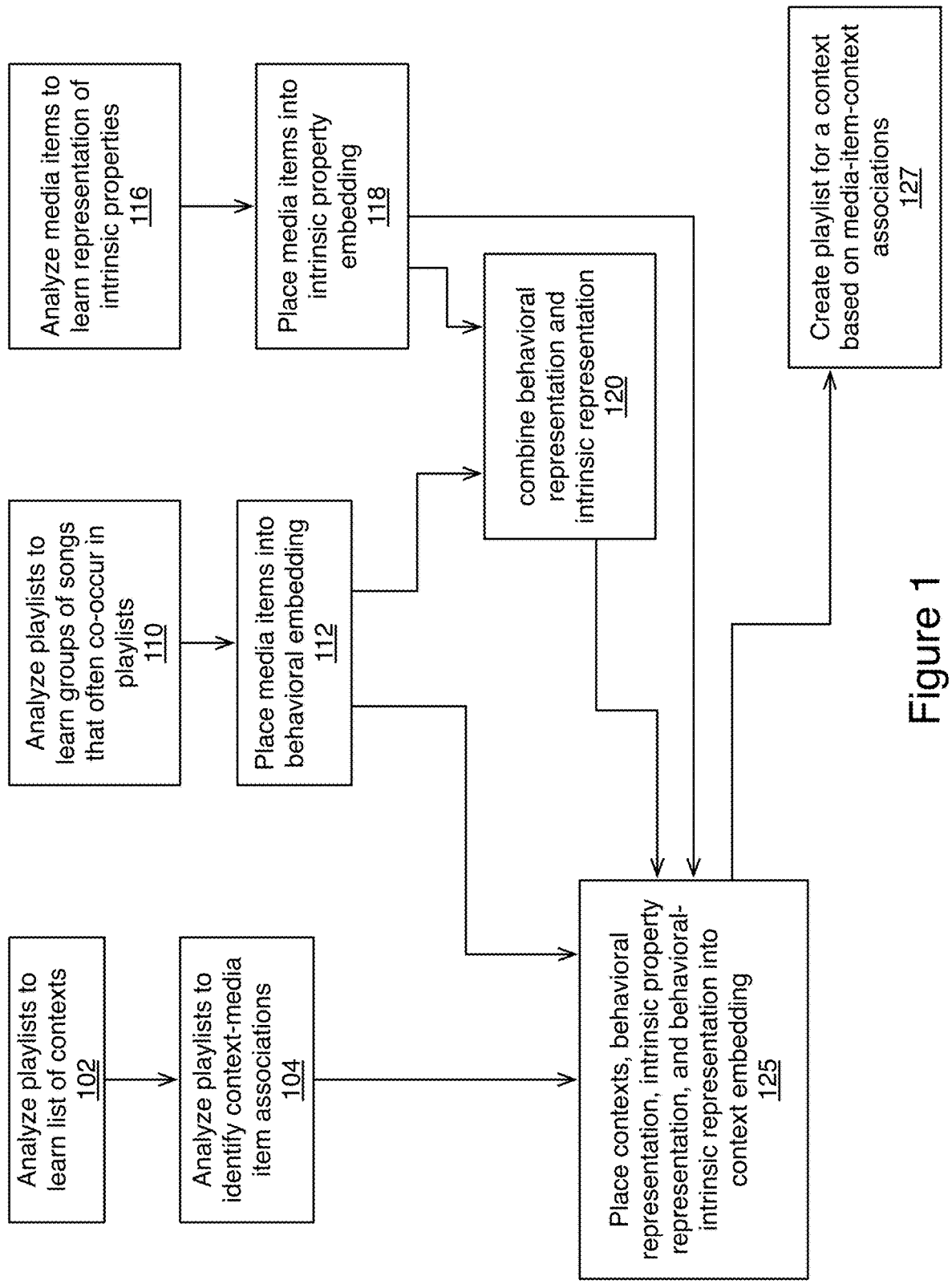
FIG. 1 illustrates an overview method of the present technology in accordance with aspects of the present technology.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

The disclosed technology addresses the need in the art for automatically labeling media items with relevant contexts, and further addresses the need in the art for algorithmically generating high quality playlists that are personalized to a profile of an account and that are built around a context, such as but not limited to a playlist title or name. As addressed above, any specific playlist is defined in part by a context. However, it is only feasible to manually tag media items with the most common tags, and even then, it is only feasible to manually tag popular media items. Accordingly, there is a need to automatically tag media items with contexts.

Unfortunately, many contexts are only subjectively definable, and selecting media items to associate with contexts is even more subjective. While solutions to other problems that also contain a highly subjective aspect have been approached through the wisdom of the crowd, such approaches are insufficient for auto labeling media items with relevant contexts because relatively few media items have been labeled with contexts in the past, and so there is only a limited amount that can be learned.

The present technology may address some of the above concerns by learning possible contexts from playlists, and their past associations with media items. Additionally, the present technology also can embed representations of media items based on subjective and intrinsic properties of the media items into an embedding space along with the learned contexts and past associations between contexts and media and predicts context-to-media-item associations for a complete catalog of media items.

One aspect of the present technology is the gathering and use of data available from various sources to improve creation of playlists for a user. The present disclosure contemplates that in some instances, this gathered data may include personal information data that uniquely identifies a specific person, and/or includes data about a user's personal preferences. While protecting personal identifying information, various embodiments can use such users' context information, playlist names, associations or information concerning music for the benefit of other users.

The present disclosure further contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. For example, personal information from users should be collected for legitimate and reasonable uses of the entity and not shared or sold outside of those legitimate uses. Further, such collection should occur only after receiving the informed consent of the users. Additionally, such entities would take any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, the present technology can be configured to allow users to select to "opt in" or "opt out" of participation in the collection of personal information data during registration for services.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data.

FIG. 1 illustrates an overview of the present technology in accordance with some embodiments. The present technology analyzes data from a variety of sources and combines these sources to predict media-item-context associations.

In order to predict media-item-context associations, a media service must first learn possible contexts. The media service can learn possible contexts by analyzing (102) playlists in accounts of a media service. Playlist titles are often descriptive of contexts, and therefore playlist titles can be the context names.

In addition to learning the possible contexts from the playlists, a media service can also analyze (104) the playlists to identify media-item-context associations (i.e., media items that have been included in playlists with the playlist titles, i.e., contexts).

The media service can also analyze (110) playlists to identify media items that often appear in the playlists together. These media items can be placed (112) into a behavioral embedding space.

Media service can also perform an analysis on individual media items to learn (116) intrinsic properties of the individual media items, and can place (118) in media items into an intrinsic property embedding space.

Media service can then place (125) the contexts and media items associated with the contexts into a context embedding space along with behavioral representations from the behavioral embedding space, and the intrinsic property representations from the intrinsic property embedding space into a context embedding space. In some embodiments, a representation of a media item that is made up of both the media item's context embedding and the media item's intrinsic embedding can also be combined into the context embedding space.

Once all of the representations are in the context embedding space, the media service can predict contexts for media items based on how close a respective media item is to a respective context in the context embedding space. Using the predicted contexts the media service can create (127) playlists for specified contexts.

Figure 2:
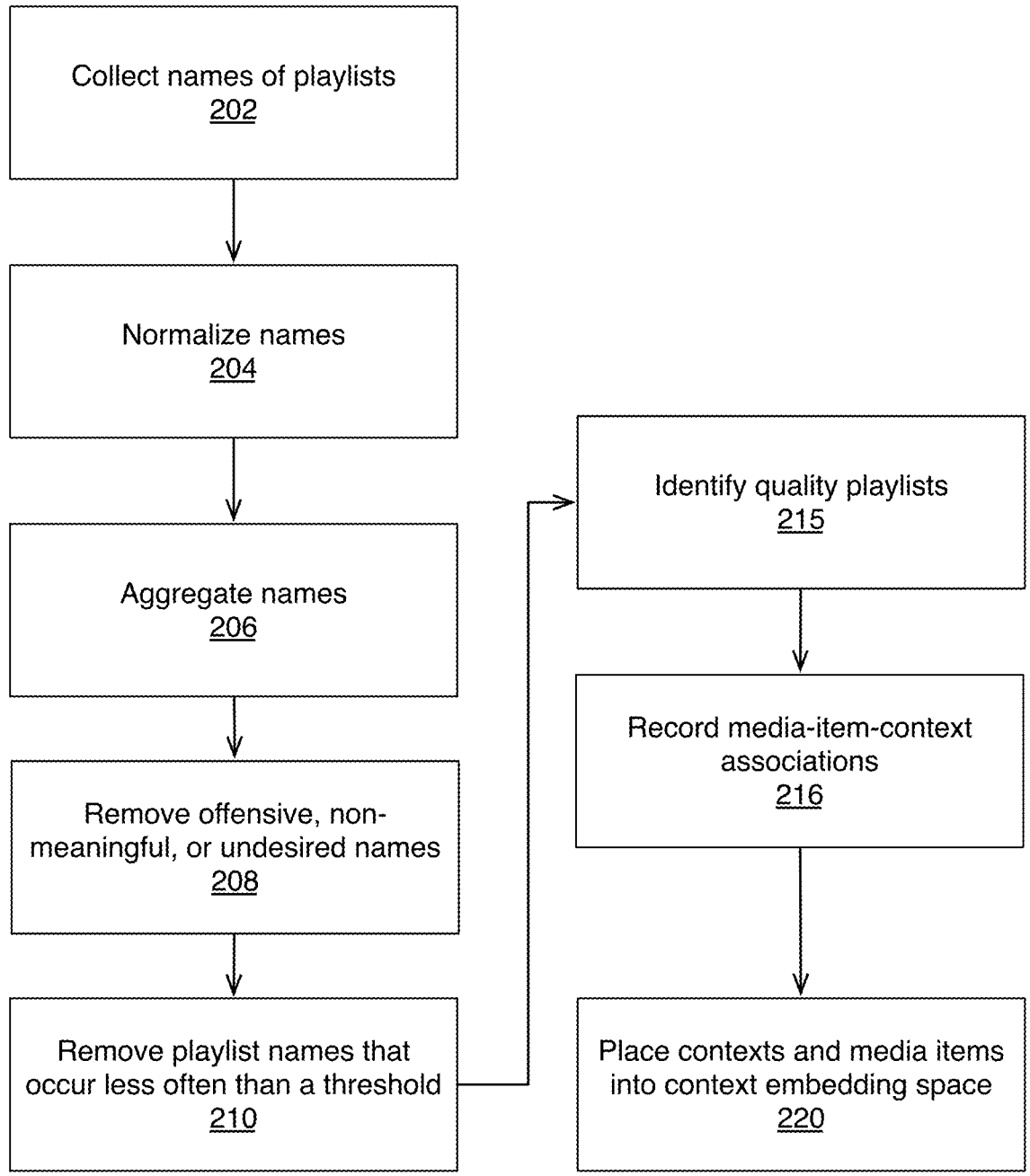
FIG. 2 illustrates an example method embodiment for identifying contexts in accordance with aspects of the present technology.
Figure 3:
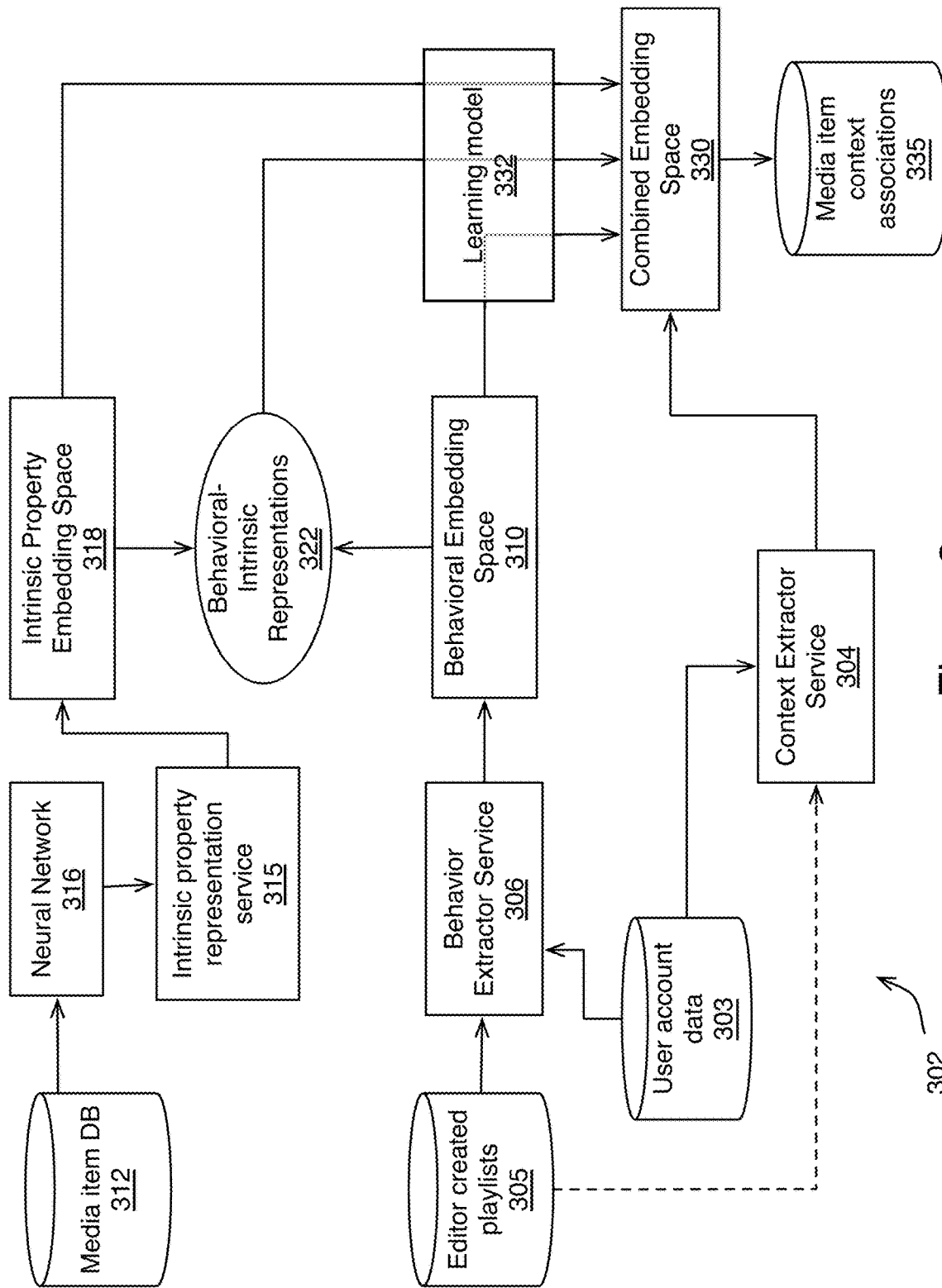
FIG. 3 illustrates an example system embodiment in accordance with aspects of the present technology.

FIGS. 2-6 illustrate example method embodiments that make up the present technology. The methods illustrated in FIGS. 2-6 illustrate details of the high-level method illustrated in FIG. 1. FIGS. 2-6 will be discussed in the context of the system illustrated in FIG. 3. However, the discussion of FIG. 3 is for illustrative purposes only, and the methods illustrated in FIGS. 2-6 should not be considered limited by the system illustrated in FIG. 3.

Context Learning

FIG. 2 illustrates an example method of extracting contexts, and media-item-context associations from playlists available to media service 302. Context extractor service 304 (FIG. 3) can collect (202) names of playlists from playlists stored in association with the user accounts in user account database 303. In some embodiments, context extractor service 304 can also collect (202) names of playlists from playlists stored in database 305 of editor created playlists. Context extractor service 304 can normalize (204) the collected names of playlists to generate one or more playlist names from a number of playlist names by removing any spaces in playlist names and by lower-casing the playlist names.

Context extractor service 304 then aggregates (206) the normalized playlist names to result in a list containing a rich vocabulary of contexts, ranging from musical genre (e.g., salsa, reggae, etc.), through moods (e.g., calm, happy, etc.) to context descriptions (e.g., beach, running, sleeping, etc.).

In some embodiments the list can be edited (208) to remove names that do not directly have meaning to other users (e.g. myplaylist, Jack's songs, xyz playlist, no name playlist), are offensive, or undesired.

Context extractor service 304 can remove (210) playlist names from the list that occur less often than a threshold so that only contexts associated with enough data to make meaningful conclusions are included in the list of contexts. The resulting list is a collection of user account and editor defined contexts.

Since these contexts are from playlist names found in user accounts of media service 302, the names of these contexts may have little to no meaning to media service 302 prior to performing the additional steps of the present technology. For example, media service does not ascribe any meaning to a beach mix. Beach does not describe media items according to known metadata—beach is not a genre or other known metadata by which media service could group media items.

In addition to analyzing playlists to identify the list of context names, context extractor service 304 can also analyze these playlists to identify (215) quality playlists to determine media-item-context associations. Context extractor service 305 considers a playlist to be a quality playlist when its title is in the list of contexts and also fulfills one or more or all of the following: (1) the playlists contains a number of tracks within a prescribed range (e.g., between 7 and 70 tracks), (2) the playlists have been compiled with at least 5 "changes", i.e. user editing events since creation of the playlist (which is a proxy for how much care went into preparing the playlist), and (3) the playlists contains at least three distinct artists.

From the playlists considered quality playlists, context extractor service 304 records (216) media-item-context associations. The media-item-context associations are a representation of the media item associated with the context defining the playlist that the media item was identified from.

FIG. 4 illustrates the media-item-context associations. The media items are represented by a value that uniquely identifies the media item by title. In some embodiments, multiple versions of the same media item are included in the list and they will be represented by the same value. The media items are also associated with the context defining the playlist that the media item was identified from. As illustrated in FIG. 4 the same media item can occur more than once if it was found in more than one playlist. FIG. 4 represents three different media items, each represented twice, and each is associated with two different contexts. Media items can also appear multiple times and be associated with the same context, and can also appear only once if the media item only appears in one quality playlist. For example the top two entries in the table illustrated in FIG. 4 are the same media item 230, as indicated by the same value in the media item representation column, but one of the entries is associated with context: workout, while the other is associated with context: gym. Likewise the middle two entries in the table illustrated in FIG. 4 are also the same media item 232 but one is associated with context: chill, while the other is associated with context: relax. The bottom two entries are also the same media item 234, and they demonstrate how different a context association can be from one user to the next. Media item 234 is associated with both with context: chill, and context: workout, which seem to be opposite contexts, and demonstrate that different users have different concepts surrounding which media items are suitable for a given context.

Returning to FIG. 2, context extractor service 304 can place (220) the contexts and the context media item associations into context embedding space 330.

Behavioral Embedding

When a person creates a playlist, they have chosen a selection of media items that the person wants to play together. Implicit in the user's behavior in creating the playlist is that its creator believes that the selections go well together as a group. Often, the creator of a playlist has also sequenced the media items so that the media items go well together in the specific order that they are listed (e.g., media items transition well, general progression of tempo throughout the playlist, etc.).

Therefore, in order to create a good algorithmically created playlist, media items must be chosen because they go well together and specifically because they go well together in a playlist. Since the media items go together well in a playlist, they may likely also go together well in the same context.

Media service 302 has access to a large number of playlists, and thus can learn which media items go well together in sequences. Specifically, media service has access to user account data 303 including user-created playlists associated with accounts of the media service, and on demand playback histories associated with accounts of the media service. Media service 302 also has access to playlists available in an online store, including editor created playlists 305. Each of the user-created playlists, the on demand playback histories (user selection of media items to playback on demand), and the editor created playlists all represent sequences of media items where a user behavior has selected the media items and the order of their playback, and therefore are potential datasets from which it can be learned which media items go well together in sequences.

FIG. 3 illustrates an example method of identifying which media items go well together in sequence through embedding media items that most often appear together in user-created media item sequences proximate to each other in an abstract, multi-dimensional behavioral embedding space 310. An embedding space is an abstract space in which media items can be inserted and located in the space of combined media items based on criteria (such as how likely two media items are to occur together in a playlist). In behavioral embedding space 310, the more often two media items are observed together in a sequence, the closer together the two items can be arranged in the embedding space.

Behavior extractor service 306 can analyze media item sequences in collections 303, 305 to identify (402) media items that are most likely to appear together in collections of media item sequences. While collection of user account data 303 includes media item sequences that are specific to specific accounts, identification 402 of media items that are most likely to appear together in collections of media item sequences is across the many media item sequences irrespective of the specific account to which the media item sequence is associated. In order to qualify as a dataset that could be analyzed in step 402, the dataset need only be a media item sequence grouped together in a user created list such as those stored in collection of user account data 303 (user created collections), and collection of editor created lists 305.

The more often two media items are identified (402) in the collections of media item sequences, the more likely the two media items are to appear together in the same sequence or playlist. Based on identification 402 of media items that are most likely to appear together in a media item sequence, the media items are embedded (404) into a behavioral embedding space 310 so that media items that are most likely to appear together in a collection of media items are located most proximate to one another in behavioral embedding space 310. In other words, media items are treated as a point in the behavioral embedding space 310 and they are placed (404) into the behavioral embedding space 310 so that they are located proximate to points representing other media items that often appear in collections of user created media item sequences.

In some embodiments clustering algorithms known to those of ordinary skill in the art can be utilized to arrange the media items in the embedding space. In some embodiments, the embedding 404 may need to be iteratively performed before an optimal embedding is observed.

Steps 402 and 404 can identify media items that have been observed to belong together in user created media item sequences, but additional analysis may need be performed to understand why the media items belong together in user created playlists. In some implementations it may be useful to attempt to understand what dimensions of the media items themselves make it so that they are selected by users to belong together in user created media item sequences.

In some embodiments, to attempt to learn dimensions of the media items that make it so that the media items located proximate to each other in the embedding space are selected by users to belong together in user created media item sequences, behavior extractor service 306 can perform techniques 406 to analyze the media items in the embedding space to identify dimensions of media items. In some cases, the identified dimensions may correspond to an easily human comprehensible attribute of the media items such as sub-genre, or some musical attribute including prominent instruments, etc., but such correspondence would be merely coincidental. The techniques are not limited to determining human comprehensible attributes, and instead the techniques will likely learn less human-definable dimensions. In some embodiments, the techniques used can be consistent with those of shallow neural networks.

Based on the output of the learning 406, vectors that are behavioral representations of the media item as defined by its dimensions can be created or adjusted 408. With continued analysis, the vectors of media items that are most proximate to each other in the embedding space should become similar.

Figure 5:
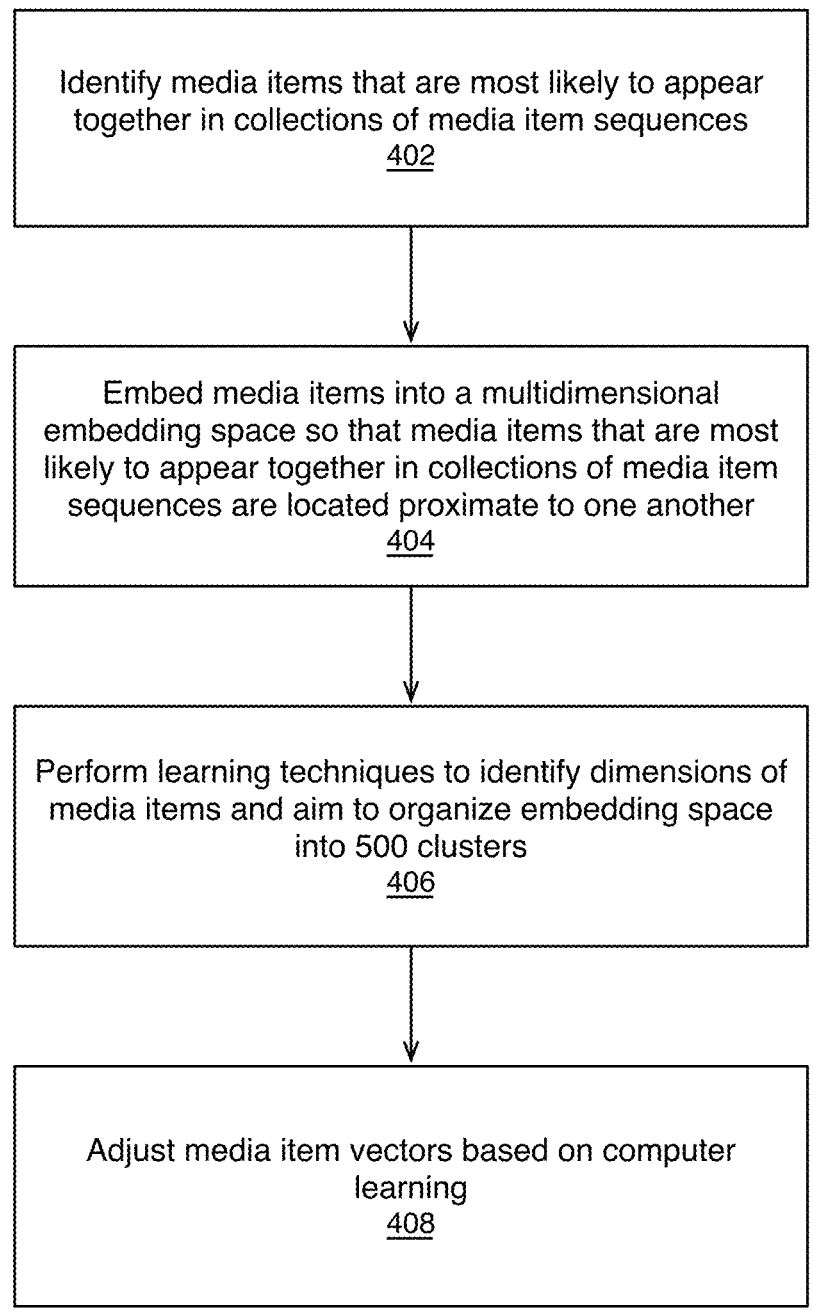
FIG. 5 illustrates an example method embodiment for creating behavioral representations of media items in accordance with aspects of the present technology.

As addressed above, the steps illustrated in FIG. 5 can be used to populate behavioral embedding space 310 with representations of media items. These representations identify and describe a media item according to observations regarding the behaviors of users of accounts of media service 302 in creating groupings of these media items. These behavioral representations of media items will be inserted into context embedding space 330 where media items represented by the behavioral representations can be located proximate to contexts that are relevant for that media item, as addressed in detail below.

Intrinsic Property Embedding

Figure 6A:
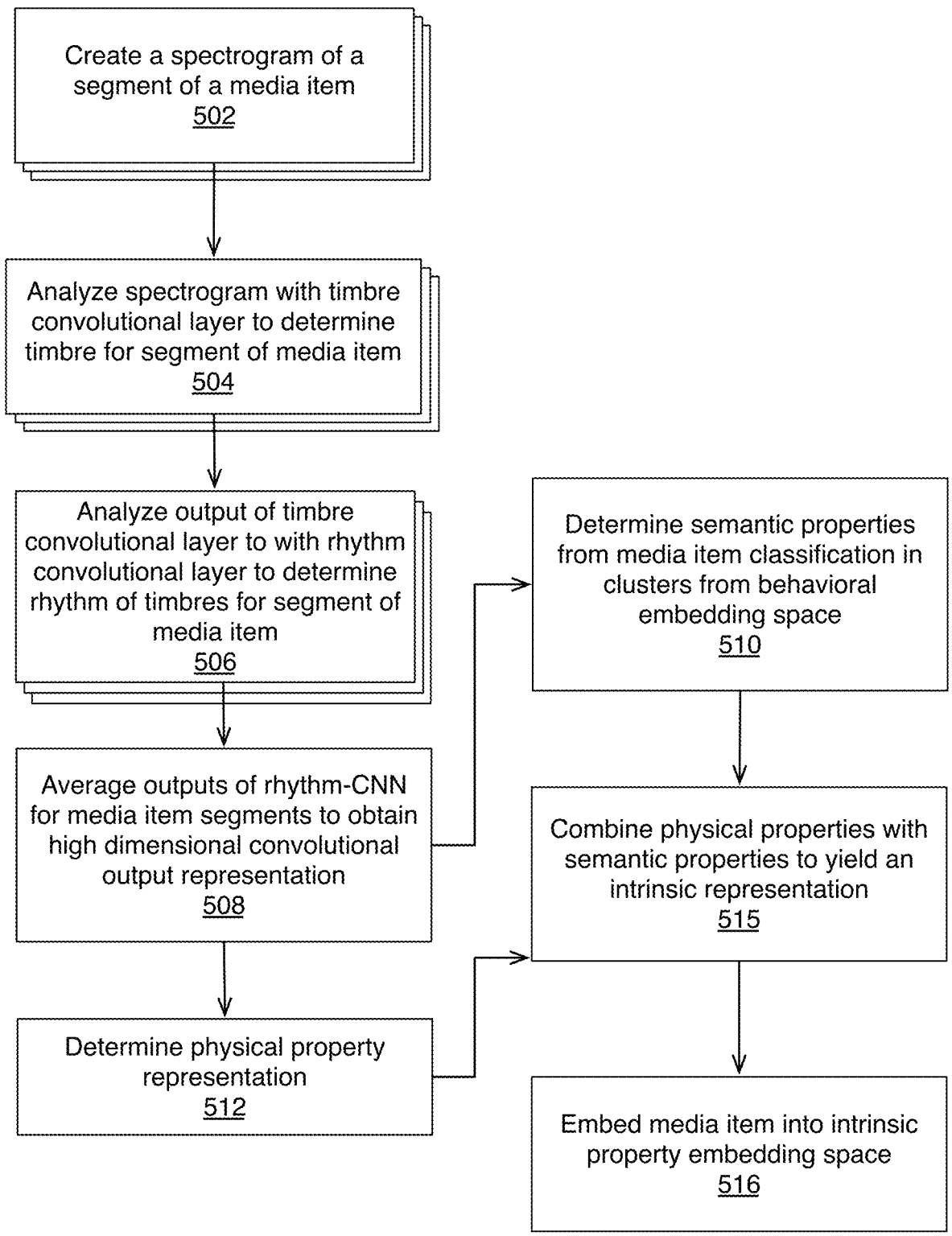
FIG. 6A illustrates an example method embodiment for creating intrinsic representations of media items in accordance with aspects of the present technology.
Figure 6B:
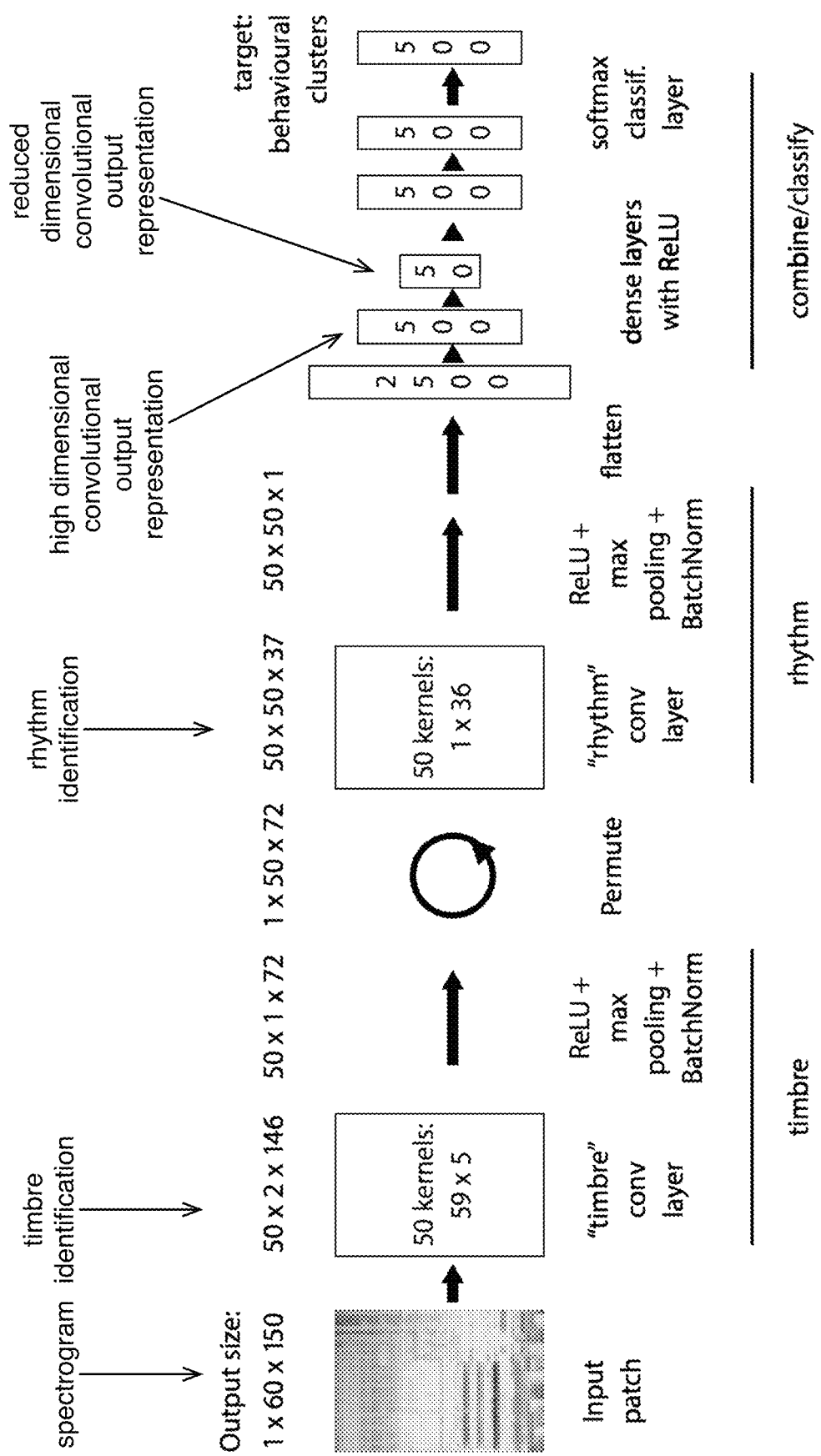
FIG. 6B illustrates an example schematic diagram for creating intrinsic representations of media items in accordance with aspects of the present technology.

One limitation of the data sources addressed above is that they rely on media items being represented in a playlist. However, this may apply to only a small number of media items compared to the total number of media items in media item database 312. Therefore, in order to expand the labeling of media items with contexts to media items that have not yet appeared in a playlist, an embodiment provides a technique to represent all media items by their intrinsic attributes. FIG. 6A and FIG. 6B illustrate an example method of deriving a representation of a media item by its intrinsic attributes. FIGS. 6A and 6B illustrate the same process and will be discussed simultaneously. The method steps illustrated in FIG. 6A shown schematically in FIG. 6B to provide better context to the method, however, the method described in FIG. 6A should not be considered limited by the system flow illustrated in FIG. 6B (e.g., the method of FIG. 6A should not be limited by any specific dimensional outputs, data processing operations, or order, etc.) unless specifically recited in the claims.

The method illustrated in FIG. 6A begins by creating (502) a spectrogram of a segment of a media item. An example of such a spectrogram is illustrated in FIG. 6B, which displays a mel spectrogram. The segment of media item represented by the spectrogram can be a couple seconds, for example a three second segment of the media item. A spectrogram is useful because it enables use of convolutional neural network (CNN) 316 configured to analyze (504) a spectrogram to determine timbres (i.e., a tone characteristic) represented in the segment of the media item. The timbre convolutional layer of CNN 316 is configured to capture presence of any of, e.g., 50 timbres. The 50 timbres represent the entire sound spectrum. The output of timbre convolutional layer is then processed according to a ReLU (see https://en.wikipedia.org/wiki/Convolutional_ neural_network for more information on convolution neural networks, convolutional layers, ReLU functions, pooling functions, and softmax functions) operation to introduce non-linearity and pooling to reduce dimensions as is common when using CNNs to result in data having 50 timbre dimensions and, e.g., 72 time dimensions. This data is passed from the timbre convolutional layer to the next convolutional layer, the rhythm convolutional layer.

The data from the timbre convolutional layer is translated and then analyzed (506) by the rhythm convolutional layer of CNN 316 to identify, e.g., 50 dimensions of rhythm, and output the 50 timbre dimensions and the 50 rhythm dimensions, yielding, for example, a potential 2500 combinations of timbre and rhythm.

Steps 502, 504, and 506 were all performed on only a short segment of the media item. As such the process can be performed in parallel for each segment of the media item. In some embodiments, the segments of the media item can be overlapping. For example a first 3 second sample might overlap with 2.5 seconds of a second sample, and the first sample might overlap with 2 seconds of a third sample, etc. After completing analysis 504, 506 of each segment of the media item, the dimensions for each segment can be averaged 508 to yield a high dimensional convolutional output representation. In some embodiments, the timbre dimensions and the rhythm of timbre dimensions are combined by averaging 508 all values or some other manner of weighting one or more dimension more heavily or less heavily than another to yield the high dimensional convolutional output representation.

The final component of CNN 316 is a softmax classification layer that is used to classify each media item into one of the 500 behavioral clusters in the behavioral embedding space (see https://en.wikipedia.org/wiki/Convolutional_neural_network for more information on convolution neural networks, convolutional layers, ReLU functions, pooling functions, and softmax functions). A softmax classification layer is a generalization of logistic regression used when classifying an input into multiple classes, and is commonly used with convolutional neural networks to classify the output of the CNN. It is useful to train the CNN as the softmax layer classifies the output of the convolutional layers into known output classifications. Thus, when training a CNN a convolutional neural network can receive a known input and it can be observed how the CNN classifies the input. When the CNN classifies the data, an amount of error can be determined and used to teach the CNN to incrementally improve. For example, the softmax classification output is compared to the representation of the correct output cluster to which the input media item belongs as addressed below. This is done by a loss function called "categorical cross-entropy". The loss obtained is then used to train the CNN by means of back-propagation. Over time, the CNN will learn to correctly classify inputs.

In some embodiments of the present technology, the softmax classification layer can receive the convolutional output representation after its dimensionality has been reduced from the high dimensional convolutional representation to a reduced dimensional convolutional representation and determine probabilities that each media item should be classified into one of the target clusters. The target clusters can be e.g., 500 behavioral clusters (in some embodiments, these 500 behavioral clusters are taken from behavioral embedding space 310). Since it is known what behavioral clusters a media item belongs in, this data is the data that is used to train the CNN.

While the softmax classification layer is important in training the CNN, its output is potentially not used in the creation of the intrinsic representations of media items, which is the desired output in the method illustrated in FIG. 6A. This output is derived from outputs of the convolutional layers as is addressed below.

As addressed at step 508, the output of the convolutional layers is a high dimensional convolutional output representation of the analyzed media item. In some embodiments, the high dimensional convolutional output representation is a 500-dimensional representation of the media item. The high dimensional convolutional output representation can be used to determine (510) semantic properties for a media item by predicting descriptive features (e.g., 12 features: fast, happy sounding, acoustic, aggressive, complex_rhythmically, danceable, energetic, harmonious, melodic, percussive, relaxing, smooth). These predictions are done by intrinsic property representation service 315 using a random forest classifier (https://en.wikipedia.org/wiki/Random_forest) trained on crowd-sourced data (crowd members were given pairs of short clips and had to vote which one was faster, more relaxing etc.). Intrinsic property representation service 315 can determine (510) semantic attributes by using the random forest classifier to quantize each of the segments of the media item into 5 levels (e.g. from non-aggressive=1 to aggressive=5) for each of the descriptive features (for example the 12 features named above). Then the predictions for the classified media item can be aggregated into dimensions, e.g., 60 dimensions (the 12 descriptive features×5 levels) to yield a semantic representation of the media item.

In addition to determining a semantic representation, intrinsic property representation service 315 can also determine (512) physical properties of the media item. Intrinsic property representation service can receive as an input a reduced dimensional convolutional output representation from CNN 316. The reduced dimensional convolutional output representation is a result of an operation performed on the high dimensional convolutional output representation to reduce the dimensionality of the representation, and the result is for example a 50 dimensional representation. In some embodiments the operation is performed with dense layers and a ReLU function.

The 50 dimensions representing physical properties of the media item, and the 60 dimensions representing the semantic properties of the media item can be combined (515) to yield an intrinsic representation of the media item.

The intrinsic representation of each media item can be embedded (516) into intrinsic property embedding space 318. As addressed above, the steps illustrated in FIGS. 6A and 6B can be used to populate an intrinsic property embedding space 310 with representations of media items. These representations identify and describe a media item according to the intrinsic properties of the media items and are not the result of subjective decisions by users. These intrinsic representations of media items will be inserted into context embedding space 330 and the media items represented by the intrinsic representations can be located proximate to contexts that are relevant for that media item, as addressed in detail below.

Combined Behavioral and Intrinsic Representations

Figures 7, 8A:
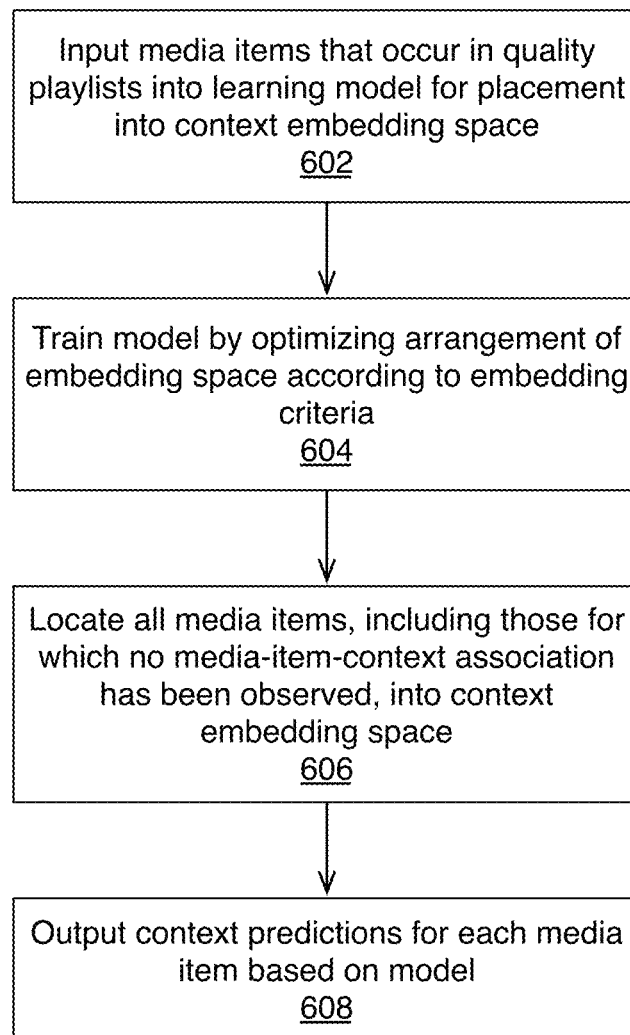
FIG. 7 illustrates an example method for creating behavioral and intrinsic representations of media items in accordance with aspects of the present technology.
FIG. 8A illustrates an example method for training a model to predict context associations for media items in accordance with aspects of the present technology.

FIG. 7 illustrates an example method for creating a combined behavioral-intrinsic representation. In FIG. 7 the intrinsic property representations of media items in the intrinsic property embedding space 318 are combined (525) with the behavioral representations of the same media items before inserting media items into context embedding space 330 using learning model 332 where media items represented by the combined behavioral and intrinsic representations can be located proximate to contexts that are relevant for that media item, as addressed in detail below. In FIG. 3 oval 322 represents the combined behavioral and intrinsic representations. 318310310318

A potential output of the combined behavioral and intrinsic representations is to provide another representation of the media item into context embedding space 330. This representation can be an important representation when training learning model 332 because it can account for media items that might appear to be similar in a behavioral representations because they are played together a lot (perhaps the media items are from the same collection) but intrinsically they are very different. The behavioral and intrinsic representations permits learning model 332 to have experience classifying media items that on the one hand might appear to be very different according to their intrinsic representations, while appearing similar according to their behavioral representations.

Model Training

Figure 8B:
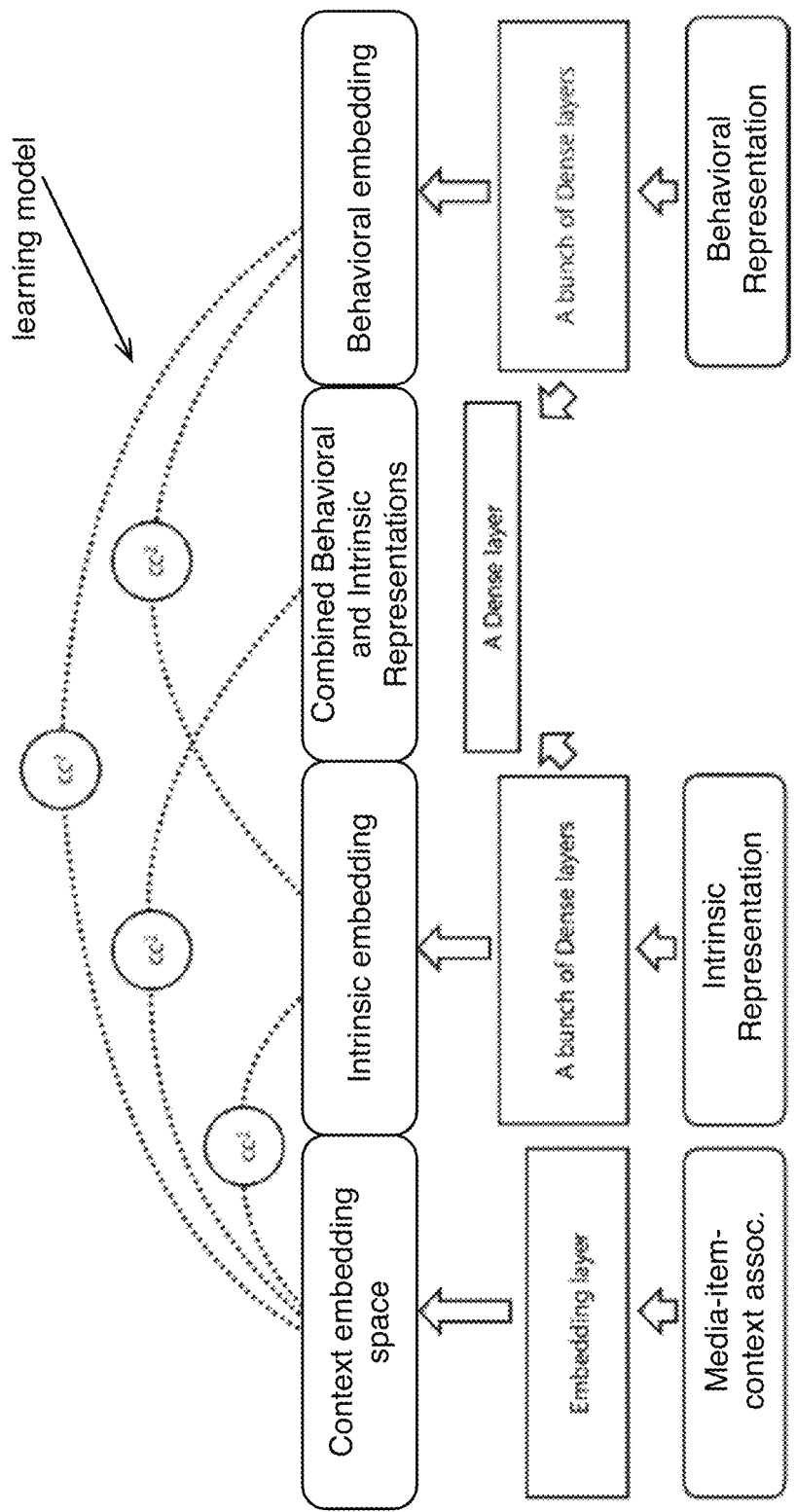
FIG. 8B illustrates an example schematic for combining various representations into a model to predict context associations for media items in accordance with aspects of the present technology.

As addressed above, FIG. 2 illustrated a method of collecting media-item-context associations, FIG. 5 illustrated a method for creating behavioral representations of media items, FIG. 6A and FIG. 6B illustrated a method for creating intrinsic representations of media items, and FIG. 7 illustrated that a behavioral representation can be combined with the intrinsic representation of the same media item. Having generated this data, the method illustrated in FIG. 8A and FIG. 8B illustrates training a model to learn how to create separate embeddings for a single media item in context embedding space 330 that represents a media item based on its respective behavioral representation, intrinsic representation, and combined behavioral and intrinsic representations.

At step 602, for media items that are found in the quality playlists (215) the intrinsic property representations from intrinsic property embedding space 318, the behavioral representations from behavioral embedding space 312, the combined behavioral and intrinsic representations 322, are input into learning model 332 to be placed into context embedding space 330.

Context embedding space 330 is a single embedding space where media items are located into the space based on their intrinsic property representations, their behavioral representations, and their combined behavioral and intrinsic representations. Contexts, are also included in context embedding space 330. The same media item can exist multiple times in combined in embedding space 330 through respective representations of the media item derived from sources (304, 310, 318, and 322) that have been combined into context embedding space 330.

Each representation (behavioral, intrinsic, and combined behavioral and intrinsic) is located into the context embedding space by learning model 332. Learning model 332 is trained (604) by requiring it to optimize the locations of the media item in the embedding space according to embedding criteria. During network training, learning model 332 seeks to optimize for multiple objectives: (1) the embedding of the media item derived from the intrinsic representation of a media item be close to the same media item's embedding derived from its context representation (and far from a media item embedded based on a randomly chosen context representation); (2) the embedding of the media item derived from the behavioral representation of a song be close to the same media item's embedding derived from its tag representation (and far from a media item embedded based on a randomly chosen context representation); (3) the embedding of the media item derived from the combined behavioral and intrinsic representations of a media item be close to the same media item's embedding derived from its context representation (and far from a media item embedded based on a randomly chosen context representation); and (4) the embedding of the media item derived from intrinsic representation of a media item be close to the same media item's embedding derived from its behavioral representation (and far from a media item embedded based on a randomly chosen behavioral representation).

FIG. 10A and FIG. 10B illustrate an example of a portion of context embedding space 330 at the start of training (FIG. 10A) and after training (FIG. 10B). Both figures show two contexts located in the embedding space: chill and workout. Additionally there are multiple representations of two different media items: media item 1, and media item 2. For each of the media items there is representation derived from its behavioral representation, its intrinsic representation, and its combine behavioral and intrinsic representation. In FIG. 10A there is no rational arrangement. The contexts of chill and workout are somewhat close to each other, and the media items are intermingled. Since the goals of the training is to bring all representations of the same song close together, the model needs to learn and try again after analyzing its error, which it may do millions of times before it is trained. In FIG. 10B, learning model 332 has achieved its goals within a reasonably low margin of error. All representations of the same media items are relatively close to each other, and they are relatively close to the context that the media item was associated with in its media-item-context association. It should be noted that the illustration of context embedding space 330 in only two dimensions is for illustration purposes only and the actual embedding space can have many more dimensions.

Context Prediction

Once the learning model 332 is trained, and context embedding space 330 has been arranged to meet the objectives of the embedding criteria, it can be used for context prediction to predict contexts for media items that did not appear in quality playlists, and thus do not have any observed context associated with them.

Representations for the media items that did not appear in quality playlists can be located (606) by trained model 332 into context embedding space 330 in the proper neighborhood of other representations of the same media item, and media items to which it is similar. Embedding space 330 is arranged such that similar contexts and media items that have an affinity for those contexts will be arranged close to each other in context embedding space 330.

For any given context, affinities for media items to the context can be determined based on each media item's distance (in some embodiments this is determined by cosine as a measure of similarity where two media items represented by a vectors will have a cosine of 1 when they are zero degrees part, a cosine of 0 when they are 90 degree apart, and a cosine of −1 when they are 180 degrees apart) from the context in context embedding space 330. The media items having the closest distance will have the highest similarity to the context can be selected.

FIG. 10B illustrates a sample of context embedding space 330 when used to predict contexts for media items. It should be noted that the illustration of context embedding space 330 in only two dimensions is for illustration purposes only and the actual embedding space can have many more dimensions. FIG. 10B illustrates context embedding space 330 around contexts: chill and chillvibe. Media items 1, 2, and 3 are more strongly associated with the context chill since they are closer to that context, while media items 4 and 6 are more strongly associated with the context chillvibe.

In some embodiments context predictions for each media item can be output to a media item-context associations database 335. In such embodiments, for any media item, a similarity value can be returned for a plurality of contexts. FIG. 9 illustrates an example of a media item with similarity values with respect to contexts as it would be stored in a media item-context associations database 335. FIG. 9 illustrates media item 230 (this is the same media item 230 illustrated in FIG. 4) identified by its unique identifier value. As stored in associations database 335, media item 230 has a strong relationship (0.98) to the workout context, and a poor association (0.12) with the chill context. The numerical values next to each context represent the relative affinity of media item 230 to the context. The greater the value the stronger the affinity for the context.

In some embodiments similarity values are only stored in media item-context associations database 335 for contexts having the greatest similarity and the least similarity to the media item, this information stored in the media item-context associations database 335. In some embodiments similarity values are only stored in media item-context associations database 335 for contexts having the greatest similarity.

The embodiments addressed above can be used to automatically label media items with affinity values for possible contexts. This data can be useful in the creation of playlists when playlists are defined by context. In the embodiments addressed above, affinities between media items and contexts were not merely observed, but rather machine learning can be used to create a model by which any media item can be input into the model to predict an affinity between the media item and a wide variety of contexts. In some embodiments, this enables media service 302 to be able to automatically create a playlist based on an input context that can be matched to the contexts in the model. Without the predicted context affinities for media items, media service 302 would only be able to create playlists for a limited set of contexts—for example contexts built around genre or measured similarities between media items.

The value of the above embodiments also goes beyond the benefit of being able to match any media item to contexts. The above embodiments also provide a mechanism to learn a large vocabulary of contexts. The wide variety of contexts encompassed by the learned vocabulary can allow playlists to be created around many more contexts than previously available. The wide variety of contexts also enables playlists to be created in response to a user's unconstrained request. For example, a user can make a natural language request for a media item, and due to the large number of contexts, it is likely that the natural language request can be indexed to a context represented in the model. The wide variety of contexts also enables playlists to be created based on multiple contexts. Whether the user provides a natural language request or the user provides explicit mention of multiple contexts (e.g., "create a playlist of 'Happy songs' and 'Beach songs" where "Happy" and "Beach" are individual contexts).

Playlisting

Figure 11:
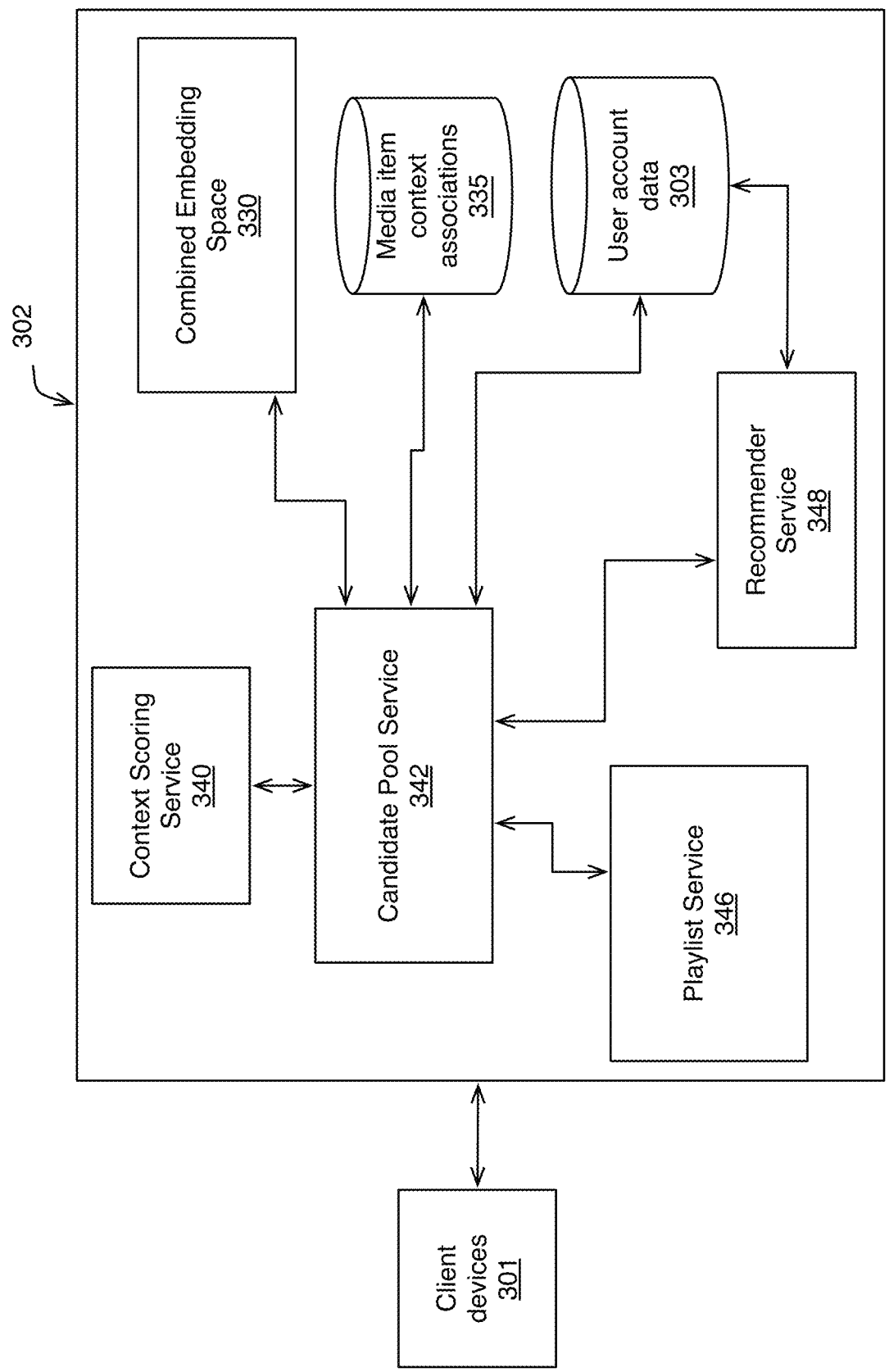
FIG. 11 illustrates an example system embodiment in accordance with aspects of the present technology.

FIGS. 8-9 illustrate example methods for creating playlists using media items labeled with a context. While FIGS. 8-9 will be explained with reference to example system illustrated in FIG. 11, the methods illustrated in FIGS. 8-9 should not be considered limited by the example system in FIG. 11.

Figure 12:
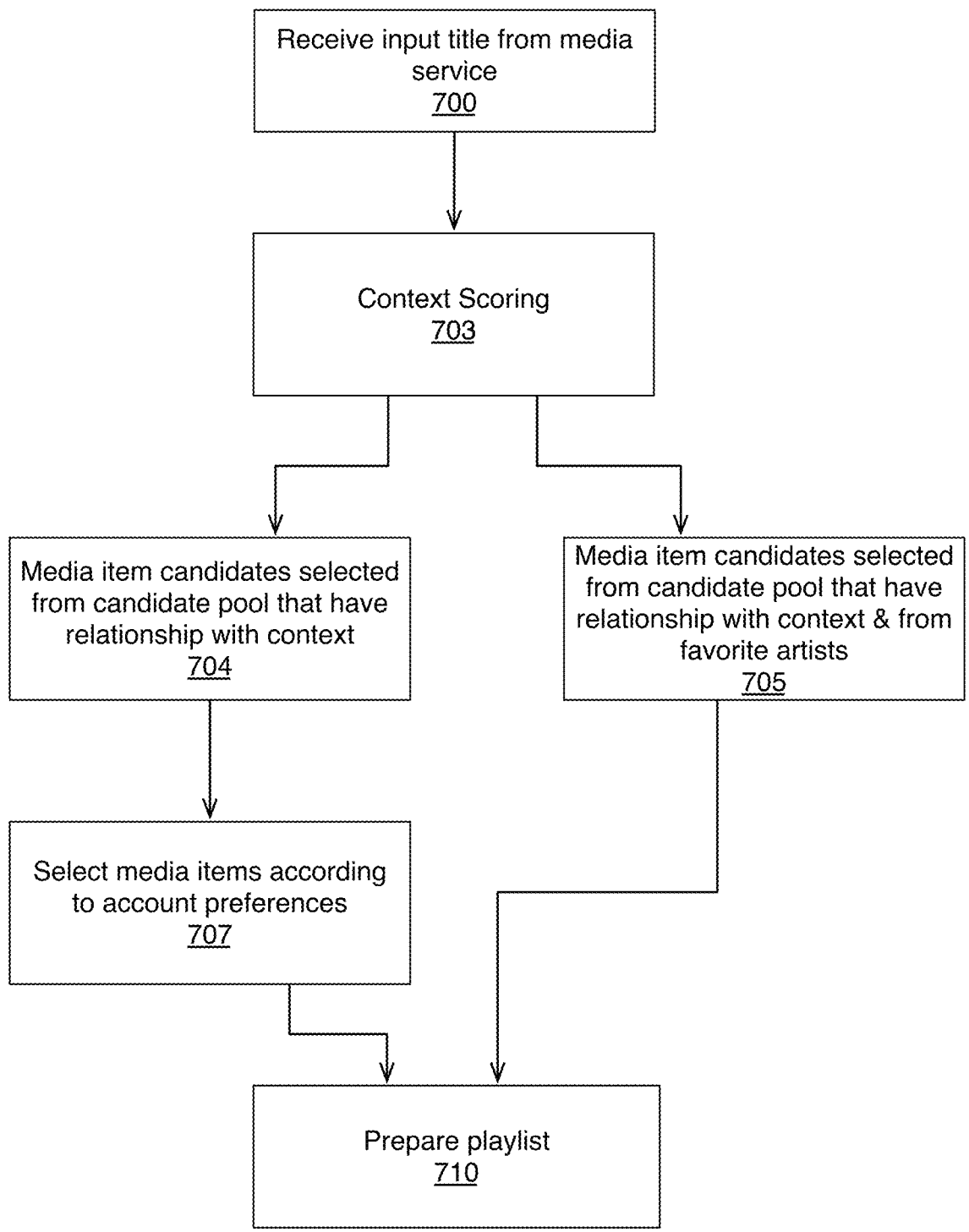
FIG. 12 illustrates an example method for creating an automatically generated playlist specific to a context in accordance with aspects of the present technology.

FIG. 12 illustrates an example method of preparing a playlist according to a known input context. In some embodiments media service 302 can automatically generate playlists and can suggest them to accounts for playback. In such embodiments, the playlist names can be known in advance, and the automatically created playlists can be periodically refreshed. Playlist service 346 can receive (700) an input title from media service 302 for which a playlist is to be automatically created.

Before retrieving media item candidates for inclusion in a candidate pool the appropriate contexts that represent the automatically created playlist must be determined. To determine the appropriate contexts, context scoring service 340 can perform context scoring 703. Context scoring is explained in more detail in FIG. 13.

Context scoring can be a process for selecting the best contexts represented in the embedding space to map to a given playlist name. For example, if playlist service 346 is attempting to create a playlist called "chill mix" is likely that there is no context in context embedding space 330 that exactly matches the title "chill mix". Therefore, context scoring is a method of determining which context in context embedding space 330 (or associated with media items in a media item context associations 335) best reflects a playlist called "chill mix".

Figure 13:
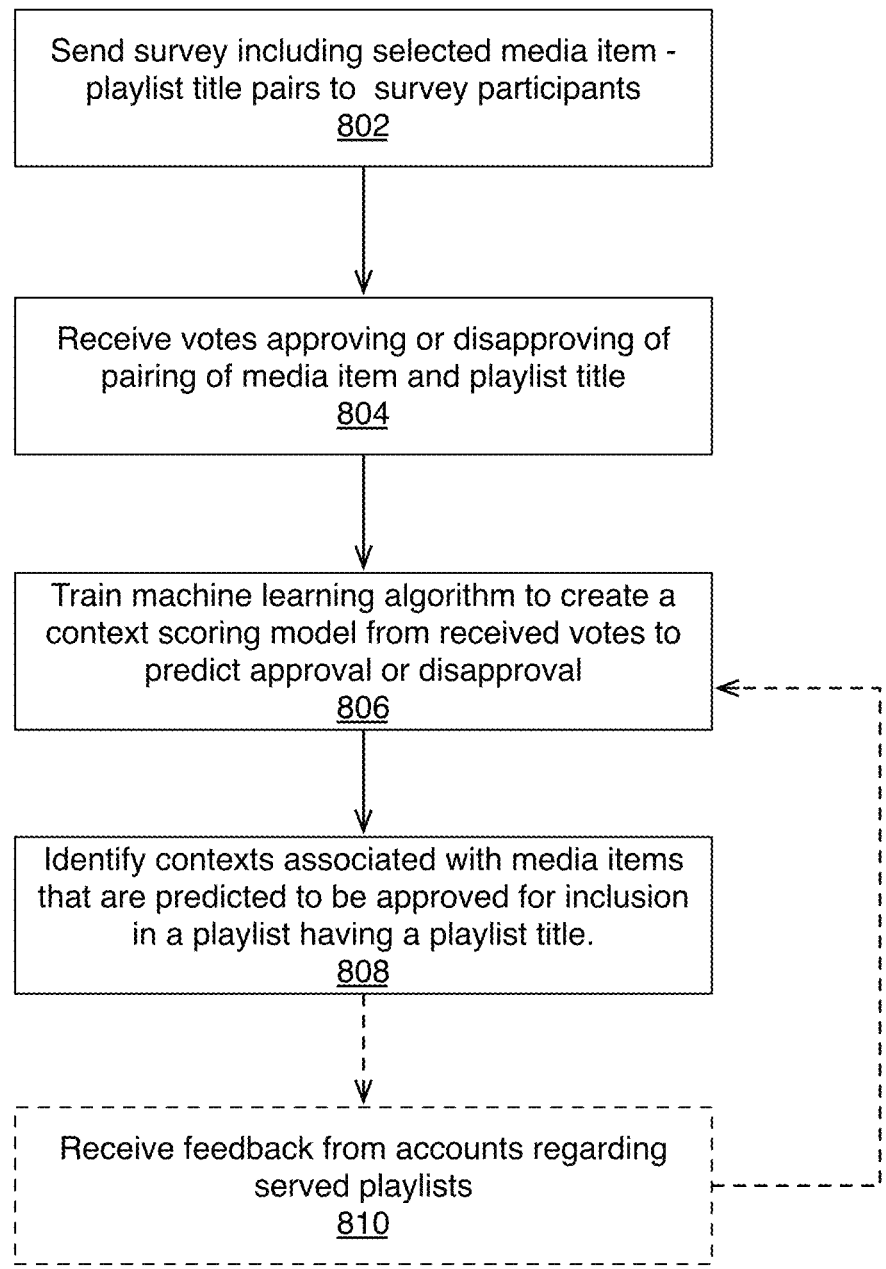
FIG. 13 illustrates an example method of scoring contexts for representing a playlist title in accordance with aspects of the present technology.

In some embodiments, one way to determine the best contexts that reflect a playlist title is to use a model to predict the best contexts for a playlist title. FIG. 13 illustrates a method of collecting data to feed into a learning algorithm to create a context scoring model to predict the best contexts to reflect a playlist title. A survey can be sent (802) to a collection of survey participants. The survey includes selected media item-playlist title pairs and requests the survey participants to provide votes approving or disapproving of the pairing of the media item and the playlist title. The survey participants can provide their votes and their votes can be received (804) by context service 340. Context scoring service 340 can train (806) a learning algorithm using the survey results to create a context scoring model that can be used to predict approval or disapproval for a media item's inclusion in a playlist having the playlist title.

Once the model is trained, context scoring service 340 can identify (808) contexts associated with media items that are predicted to be approved for inclusion in a playlist having a playlist title. The contexts that are most strongly associated with the media items that are predicted to be approved for inclusion in a playlist are selected as the contexts that best represent the playlist having the playlist title.

In some embodiments, machine learning can receive feedback (810) from user accounts that have played back automatically generated playlists. The feedback can include media item likes or dislikes or media item skips. This feedback works the same as the approvals and disapprovals from the survey used train (806) the model, and also has the benefit of being account specific. Since the received (810) feedback is account specific, contexts that best reflect the playlist title according to the user of the account can be selected as the contexts used to make the playlist specific for the account (i.e., the automatically generated playlist becomes more personalized).

Referring back to FIG. 12, after context scoring (703) has been completed and the context(s) that best reflect the playlist title have been selected, playlist service 346 can request candidates from candidate pool service 342 for a playlist matching the input context(s). Candidate pool service 342 can obtain media items that have an affinity for the input context(s) for inclusion in a candidate pool. Candidate pool service 342 can obtain (704) any media item candidates that are found to have a significant affinity for the input context(s) from media-item-context associations database 335. These media items are not limited by user preferences, and the resulting media item candidates can be any media item in media item database 312—these can be referred to as the global set of media item candidates. Candidate pool service 342 can also obtain (705) media item candidates that are found to have a significant affinity for the input context(s) from media item context associations 335 that are from favorite artists for a specific user account. Accordingly, candidate pool service 342 can retrieve account preferences from user account data 303 to learn of favorite artists, and can then select media items by those favorite artists that also have an affinity for the input context from media item context associations 335. The media item candidates retrieved in steps 704 and 705 can be placed into a global candidate pool, and a personalized candidate pool, respectively.

In some embodiments, candidate pool service 342 can also obtain the media item candidates in step 704 and 705 directly from context embedding space 330. However, it can be more efficient to maintain media item context associations 335 for at least the most commonly requested contexts.

Once obtained, media items in the global candidate pool from step 704 are provided to recommender service 348 to select (707) media items according to account preferences. This step can personalize the automatically created playlist to the user account. Since the candidates selected in step 704 were selected because they had a strong association with a context, the candidates can vary widely and many will not match a media item preference profile of the account for which the automatic playlists being created. For example media items selected because they have a strong association with the context chill can span variety of genres. Therefore a (chill mix) for one user account can include very different media items than a playlist created around the same context for another user account.

Recommender service 348 can access user account data 303 to retrieve a playback history associated with a specific account of the playback service 302. Recommender service 348 can perform machine learning techniques on user account data 303. The specific leanings from the machine learning techniques can include some more conceptual characteristics such as low level musical characteristics of media items that the user listens to, how time of day or environment affects what a user might listen to, how popularity of a media item affects playback, etc. However, the leanings from the machine learning techniques might be less conceptual too.

Recommender service 348 can weight media items from user account data 303 according to one or more of outputs of machine learning, and factors such as recency of playback, rights model, metadata, etc. For example, the machine learning process can determine that particular media items from user account data 303 are closely aligned to the user account's current music interest and can weight these items heavily. Additionally, media items that have been played back more recently are more likely to represent the user's current music interest and so they can be weighted more heavily than media items listen to two months ago. Additionally, a media item added to the user's media library can be weighted more heavily than a media item that was merely streamed. Likewise, a media item that was purchased when the same media item was available through a subscription model could be weighted even more heavily. Similarly, a media item that is accompanied by metadata that indicates a user's interest—such as a ranking, or a like or heart, can also be used to weight an item more heavily. Additional factors are also possible. Factors can be used in isolation or in combination to yield weighted media items.

In some embodiments this can be determined by locating a representation of a user account in an embedding space with media items. Media items located closest to the representation of the account can be given a higher weight, while media items located further away from the representation of the account can be given a lower weight. However, it should be appreciated that many different recommenders are known in the art, and any can be used in combination with the present technology.

After recommender service 348 has selected (707) media items according to account preference the selected media items from recommender service 348 and media item candidates from step 705 can make up a final candidate pool. Note that the media item candidates from step 705 do not need to be evaluated by recommender service 348 because these media item candidates were selected because they are from the favorite artists of the user account and thus they already reflect the media item preference profile of the account.

Playlist service 346 can prepare a playlist from the media item candidate pool obtained by candidate pool service 342. Playlist service 346 can select media item candidates from the candidate pool on the basis of many factors, but one important factor is that media items selected for the automatically created playlist should go well together in a playlist in the sequence that they are arranged. In some embodiments playlist service 346 can select of media items included in the automatically created playlist according to a sequence model to prepare (710) the playlist. In some embodiments the sequence model can also have been created as the result of machine learning by analyzing playlists created by user accounts. One such sequencing model is described in U.S. application Ser. No. 14/684,063, filed on Apr. 10, 2015 and titled "Content Item Recommendations Based On Content Attribute Sequence", and is incorporated by reference herein in its entirety. In some embodiments the sequence model can be subject to heuristics that prevent media items from divergent genres or that have significantly different tempos from being placed next to each other in the sequence.

The playlist resulting from the method illustrated in FIG. 12 is an automatically created playlist with media items that go well together in a context reflected by the name of the playlist. The media items in the automatically created playlist also match immediate taste profile for the user account in which the playlist was created. And finally, the playlist includes media items arranged together in a pleasing sequence. Collectively, these aspects result in a superior automatically generated playlist.

Figure 14:
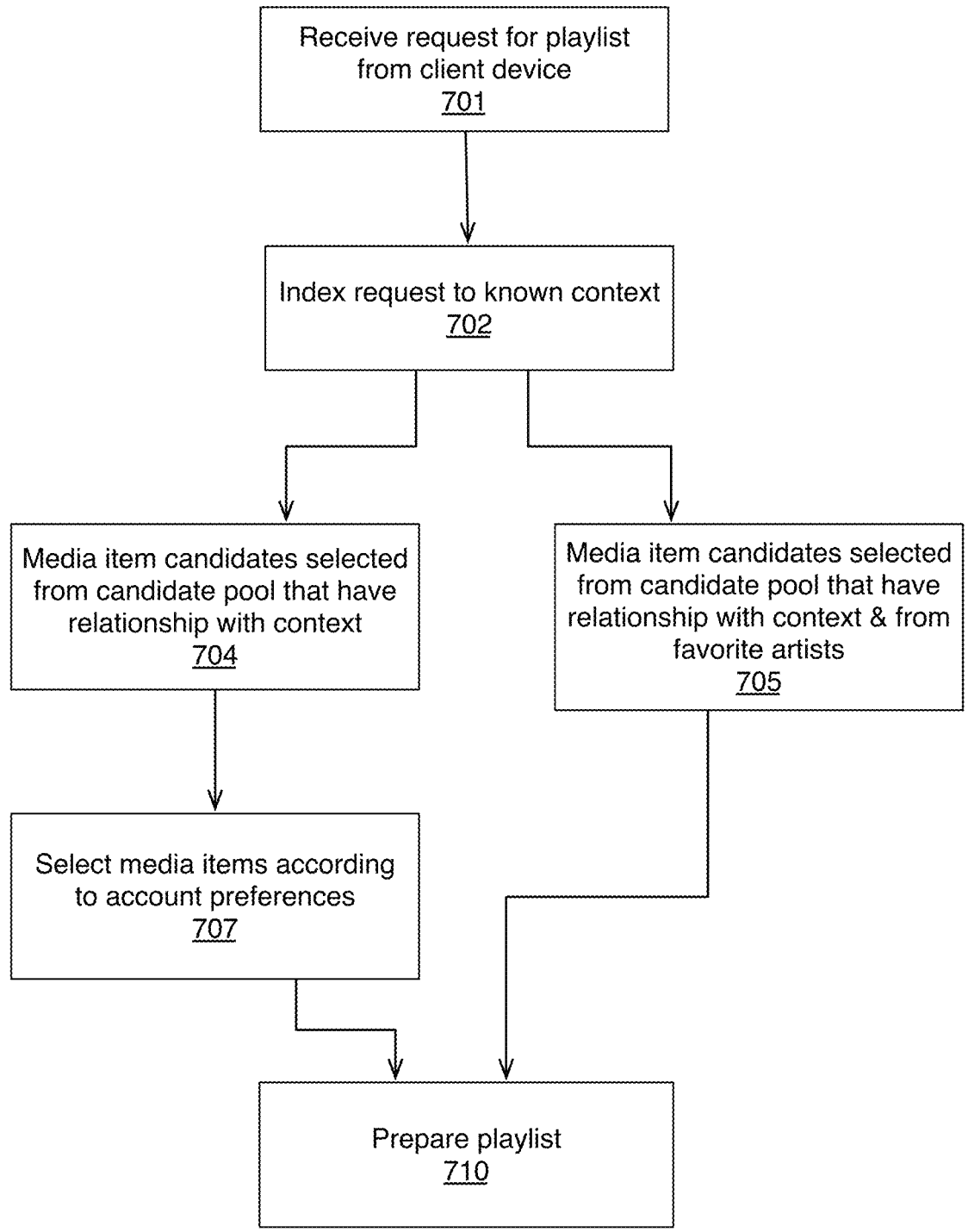
FIG. 14 illustrates an example method for creating an automatically generated playlist specific to a context based on an unstructured request in accordance with aspects of the present technology.

FIG. 14 illustrates another method embodiment for creating a playlist from an input context provided in an unstructured request. In FIG. 14, playlist service 346 can receive (701) a request for a playlist from client device 301. The request can be natural language request provided to a virtual assistant either through a spoken request or written, or the request can be provided in a media service application user interface. Even if not provided in a sentence form, the request be for a playlist of any description. Playlist service 346 next identifies (702) one or more known context(s). Since the received request is not likely to map directly to a known context represented in context embedding space 330, playlist service 346 needs to determine which contexts that are represented in context embedding space 330 best reflect the context requested in the received (701) request. To do this, playlist service 346 can utilize natural language processing techniques to identify the semantic significance of the received request, and can index (702) the request to known contexts represented in context embedding space.

Note that while context scoring service 340 might be able to identify contexts in accordance with the received (701) request, it will only be useful when the request can be mapped to a context(s) for which the context scoring service model has been trained. Since the input at step 701 is not restricted to known titles or contexts, context scoring service 340 will not be effective for many requests.

Once playlist service 346 has determined (702) known contexts that reflect the received request, steps 704, 705, 707, and 710 can be carried out in the same manner as described above in FIG. 12 to result in a playlist with media items that go well together in a context reflected by the received (701) request. The media items in the automatically created playlist should also match immediate taste profile for the user account in which the playlist was created. And finally, the playlist should also include media items arranged together in a pleasing sequence. Collectively, these aspects result in a superior automatically generated playlist.

In embodiments where the received request is best mapped to two or more individual contexts, playlist service 346 can handle the request in multiple ways. In some embodiments, playlist service 346 can the individual contexts in the embedding space, and then find the point halfway between them, that point should be surrounded by music that satisfies both contexts. For example if the request is mapped to happy and beach contexts, playlist service 346 can identify media items in between the context happy and the context beach in the embedding space. In some embodiments, playlist service 346 can find media items associated with the first context, and media items associated with the second context, and find songs in common. For example, playlist service 346 can find media items associated with the context happy and media items associated with the context beach. Any media items associated with both contexts can be selected for inclusion in the playlist.

While the present technology has primarily been discussed in the context of automatically creating a playlist based on a context that is personalized to the taste associated with a user's profile, in some embodiments this personalization can be optional. It can be possible for a user to optionally request a playlist that is not personalized. In some embodiments, personalization might not be possible, if there is not enough data associated with the user profile, e.g., in the case of a new user. Such possibilities are fully contemplated within the present technology.

Figure 15:
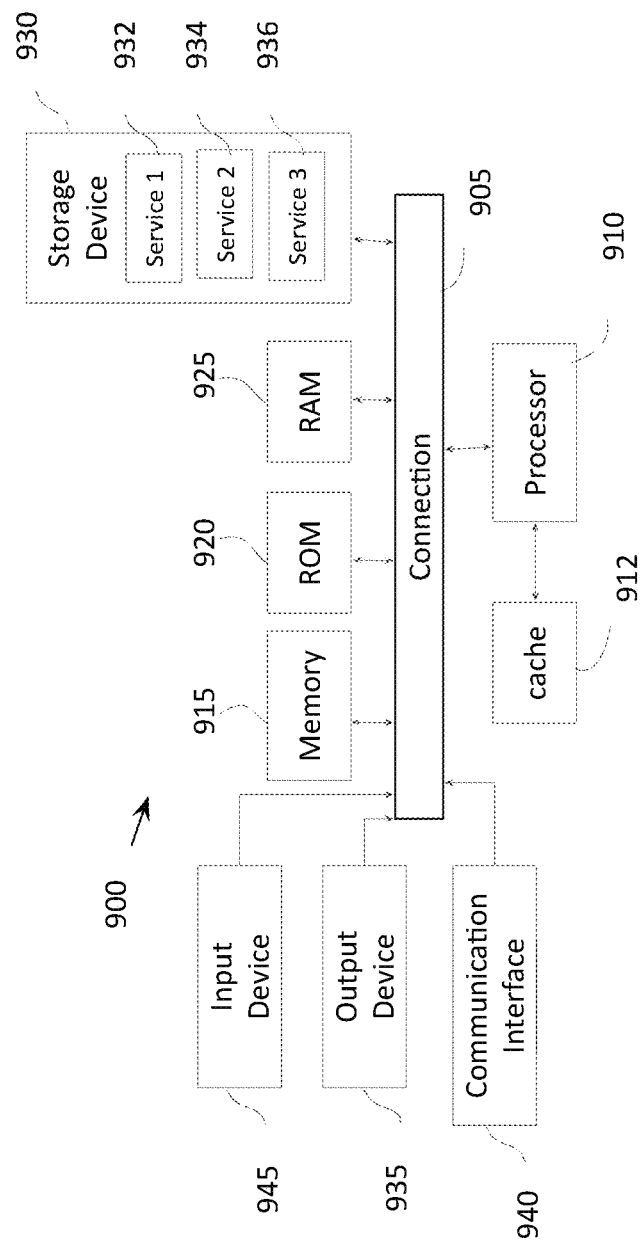
FIG. 15 illustrates an example computing system architecture in accordance with aspects of the present technology.

FIG. 15 shows an example of computing system 900, which can be for example any computing device making up media service 302, in which the components of the system are in communication with each other using connection 905. Connection 905 can be a physical connection via a bus, or a direct connection into processor 910, such as in a chipset architecture. Connection 905 can also be a virtual connection, networked connection, or logical connection.

In some embodiments computing system 900 is a distributed system in which the functions described in this disclosure can be distributed within a datacenter, multiple datacenters, a peer network, etc. In some embodiments, one or more of the described system components represents many such components each performing some or all of the function for which the component is described. In some embodiments, the components can be physical or virtual devices.

Example system 900 includes at least one processing unit (CPU or processor) 910 and connection 905 that couples various system components including system memory 915, such as read only memory (ROM) and random access memory (RAM) to processor 910. Computing system 900 can include a cache of high-speed memory connected directly with, in close proximity to, or integrated as part of processor 910.

Processor 910 can include any general purpose processor and a hardware service or software service, such as services 932, 934, and 936 stored in storage device 930, configured to control processor 910 as well as a special-purpose processor where software instructions are incorporated into the actual processor design. Processor 910 may essentially be a completely self-contained computing system, containing multiple cores or processors, a bus, memory controller, cache, etc. A multi-core processor may be symmetric or asymmetric.

To enable user interaction, computing system 900 includes an input device 945, which can represent any number of input mechanisms, such as a microphone for speech, a touch-sensitive screen for gesture or graphical input, keyboard, mouse, motion input, speech, etc. Computing system 900 can also include output device 935, which can be one or more of a number of output mechanisms known to those of skill in the art. In some instances, multimodal systems can enable a user to provide multiple types of input/output to communicate with computing system 900. Computing system 900 can include communications interface 940, which can generally govern and manage the user input and system output. There is no restriction on operating on any particular hardware arrangement and therefore the basic features here may easily be substituted for improved hardware or firmware arrangements as they are developed.

Storage device 930 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read only memory (ROM), and/or some combination of these devices.

The storage device 930 can include software services, servers, services, etc., that when the code that defines such software is executed by the processor 910, it causes the system to perform a function. In some embodiments, a hardware service that performs a particular function can include the software component stored in a computer-readable medium in connection with the necessary hardware components, such as processor 910, connection 905, output device 935, etc., to carry out the function.

For clarity of explanation, in some instances the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program, or a collection of programs that carry out a specific function. In some embodiments, a service can be considered a server. The memory can be a non-transitory computer-readable medium.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, solid state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

The invention claimed is:

1. At least one non-transitory computer readable medium comprising instructions stored on the computer readable medium that when executed cause a computing system to:
   obtain a plurality of media items from a plurality of user-defined playlists from user accounts of a media service;
   determine a plurality of contexts based on playlist titles of the plurality of user-defined playlists;
   identify context associations between media items and the plurality of contexts;
   generate a behavioral representation of the plurality of media items based on the context associations, wherein the behavioral representation is based on occurrences of media items appearing in common playlists;
   generate an intrinsic representation of the plurality of media items based on properties of each of the plurality of media items;
   form a combination representation from the behavioral representation and the plurality of intrinsic representations; and
   select media items for inclusion in a candidate pool for an input context, the selected media items being associated with the input context in the combination.

2. The at least one non-transitory computer readable medium of claim 1 wherein the instructions are effective to cause the computing system to:
   receive the input context from a client device associated with a user account of the user accounts, the input context originating from a request made by a user of the device, wherein the device has processed the request to determine the input context.

3. The at least one non-transitory computer readable medium of claim 1 wherein the instructions are effective to cause the computing system to:
   determine media items from the candidate pool that are compatible with a media item profile of a user account of the user accounts, for which a playlist is being created; and
   create the playlist from the media items that are compatible with the media item profile of the account.

4. The at least one non-transitory computer readable medium of claim 3 wherein the instructions to create a playlist include instructions to:
   apply a sequencing model to the media items compatible with the media item profile to determine media items that can be combined into an acceptable sequence for inclusion in the playlist.

5. The at least one non-transitory computer readable medium of claim 1 wherein the instructions to determine the collection of account defined contexts include instructions to:
   aggregate playlist titles from accounts of a media service;
   remove playlist titles for which context is not ascertainable; and
   select the playlist titles that remain that appear in greater than a threshold number of accounts of the media service to yield a collection of account defined contexts.

6. The at least one non-transitory computer readable medium of claim 1 wherein the instructions are effective to cause the computing system to:
   create a behavioral representation for media items available from a media service, wherein the instructions to create the behavioral representation include instructions to cause the computing system to:
   perform clustering on the media items available from the media service, wherein the media items are clustered according to a likelihood that respective media items appear together in a playlist;
   derive the behavioral representation for each media item based on its respective arrangement within clusters with respect to other media items.

7. The at least one non-transitory computer readable medium of claim 1 wherein the instructions are effective to cause the computing system to:
   create an intrinsic property representation for media items available from a media service, wherein the instructions to create the intrinsic property representation include instructions to cause the computing system to:
   analyze the media items available from the media service to determine physical properties of each media item;
   analyze the media items available from the media service to determine semantic characteristics of each media item;
   combine the physical properties with the semantic characteristics to result in an intrinsic property representation.

8. The at least one non-transitory computer readable medium of claim 7, wherein the instructions to analyze the media items available from the media service to determine physical properties of each media item include instructions to:
   analyze each media item for timbre properties;
   analyze each media item for rhythm properties; and
   output the physical properties representing the timbre properties and the rhythm properties.

9. The at least one non-transitory computer readable medium of claim 8, wherein the instructions to analyze each media item for timbre properties includes analyzing each media item in temporal segments with a convolutional neural network to create a representation of timbre properties, and wherein the instructions to analyze each media item for rhythm properties includes instructions to analyze the representation of timbre properties over time with the convolutional neural network to yield the rhythm properties.

10. The at least one non-transitory computer readable medium of claim 1, wherein the instructions are effective to cause the computing system to:

train a learning model to insert media items into the combination, the learning model being trained by optimizing media item insertions to:

minimize a distance between pairs of account defined contexts and media items associated with the account defined contexts, minimize a distance between pairs of media items having similar respective behavioral and intrinsic representations, minimize a distance between pairs of media items having similar respective behavioral representations, and minimize a distance between pairs of media items having similar respective intrinsic property representations, which results in an arranged context embedding space.

11. The at least one non-transitory computer readable medium of claim 10, wherein the instructions to include media items not associated with the account defined contexts into the context embedding space includes instructions to:

insert a combined behavioral and intrinsic representations for the respective media items into the combination using the trained learning model;

insert the behavioral representations for the respective media items into the combination using the trained learning model;

insert the intrinsic property representations for the respective media items into the combination using the trained learning model.

12. The at least one non-transitory computer readable medium of claim 10, wherein the instructions are effective to cause the computing system to:

output media-item-context associations based on a distance between representations of a respective media item and an account defined context in the combination.

13. The at least one non-transitory computer readable medium of claim 12, wherein the instructions to select media items for inclusion in the candidate pool includes selecting media items having a media-item-context association with the input context greater than a threshold, and wherein the instructions are effective to cause the computing system to:

select media items that are compatible with a media item profile of an account from the candidate pool for inclusion in a playlist targeted to the input context.

14. A system comprising:

one or more processors; and at least one non-transitory computer readable medium comprising instructions stored on the computer readable medium that when executed by the one or more processors cause the system to:

obtain a plurality of media items from a plurality of user-defined playlists from user accounts of a media service;

determine a plurality of contexts based on playlist titles of the plurality of user-defined playlists;

identify context associations between media items and the plurality of contexts;

generate a behavioral representation of the plurality of media items based on the context associations, wherein the behavioral representation is based on occurrences of media items appearing in common playlists;

generate an intrinsic representation of the plurality of media items based on properties of each of the plurality of media items;

form a combination representation from the behavioral representation and the plurality of intrinsic representations; and select media items for inclusion in a candidate pool for an input context, the selected media items being associated with the input context in the combination.

15. The system of claim 14, further comprising instructions to cause the system to:

create an intrinsic property representation for media items available from a media service, wherein the instructions to create the intrinsic property representation include instructions to cause the computing system to:

analyze the media items available from the media service to determine physical properties of each media item;

analyze the media items available from the media service to determine semantic characteristics of each media item;

combine the physical properties with the semantic characteristics to result in an intrinsic property representation.

16. The system of claim 15, wherein the instructions to analyze the media items available from the media service to determine physical properties of each media item include instructions to:

analyze each media item for timbre properties;

analyze each media item for rhythm properties; and output the physical properties representing the timbre properties and the rhythm properties.

17. The system of claim 16, wherein the instructions to analyze each media item for timbre properties includes analyzing each media item in temporal segments with a convolutional neural network to create a representation of timbre properties, and wherein the instructions to analyze each media item for rhythm properties includes instructions to analyze the representation of timbre properties over time with the convolutional neural network to yield the rhythm properties.

18. A method, comprising:

obtaining a plurality of media items from a plurality of user-defined playlists from user accounts of a media service;

determining a plurality of contexts based on playlist titles of the plurality of user-defined playlists;

identifying context associations between media items and the plurality of contexts;

generating a behavioral representation of the plurality of media items based on the context associations, wherein the behavioral representation is based on occurrences of media items appearing in common playlists;

generating an intrinsic representation of the plurality of media items based on properties of each of the plurality of media items;

forming a combination representation from the behavioral representation and the plurality of intrinsic representations; and selecting media items for inclusion in a candidate pool for an input context, the selected media items being associated with the input context in the combination.

19. The method of claim 18, further comprising:

creating a behavioral representation for media items available from a media service;

performing clustering on the media items available from the media service, wherein the media items are clustered according to a likelihood that respective media items appear together in a playlist; and deriving the behavioral representation for each media item based on its respective arrangement within clusters with respect to other media items.

20. The method of claim 18, further comprising:

creating an intrinsic property representation for media items available from a media service;

analyzing the media items available from the media service to determine physical properties of each media item;

analyzing the media items available from the media service to determine semantic characteristics of each media item; and combining the physical properties with the semantic characteristics to result in an intrinsic property representation.

* * * * *